US010255278B2

(12) United States Patent
Kim et al.

(10) Patent No.: US 10,255,278 B2
(45) Date of Patent: Apr. 9, 2019

(54) MOBILE TERMINAL AND CONTROLLING METHOD THEREOF

(71) Applicant: LG ELECTRONICS INC., Seoul (KR)

(72) Inventors: Jonghwan Kim, Seoul (KR); Minju Jeon, Seoul (KR); Yunmi Kwon, Seoul (KR); Sooyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/534,996

(22) PCT Filed: Mar. 24, 2015

(86) PCT No.: PCT/KR2015/002864
§ 371 (c)(1),
(2) Date: Jun. 9, 2017

(87) PCT Pub. No.: WO2016/093434
PCT Pub. Date: Jun. 16, 2016

(65) Prior Publication Data
US 2017/0351665 A1    Dec. 7, 2017

(30) Foreign Application Priority Data
Dec. 11, 2014    (KR) .......................... 10-2014-0178496

(51) Int. Cl.
*G06F 17/28*    (2006.01)
*H04M 1/725*    (2006.01)
(Continued)

(52) U.S. Cl.
CPC ........ *G06F 17/289* (2013.01); *G06F 3/04842* (2013.01); *G06F 3/04845* (2013.01);
(Continued)

(58) Field of Classification Search
CPC .... G06F 17/28; G06F 17/289; G06K 9/00442
See application file for complete search history.

(56) References Cited

U.S. PATENT DOCUMENTS 8,380,485 B1    2/2013    Callahan
8,761,513 B1 *  6/2014    Rogowski ........... G06F 17/2854
                                        382/135
(Continued)

FOREIGN PATENT DOCUMENTS

WO    2012036345    3/2012

OTHER PUBLICATIONS

PCT International Application No. PCT/KR2015/002864, Written Opinion of the International Searching Authority dated Aug. 26, 2015, 16 pages.

*Primary Examiner* — Brian L Albertalli
(74) *Attorney, Agent, or Firm* — Lee, Hong, Degerman, Kang & Waimey

(57) ABSTRACT

A mobile terminal and controlling method thereof are provided. The mobile terminal includes a camera, a display unit configured to display a preview image obtained by the camera, and a controller configured to detect a first command for entering a translation mode, output a GUI window for selecting at least one partial region of a text included in the preview image to the display unit in response to the detected first command, control the display unit to display a translation result of a text corresponding the GUI window on the preview image.

16 Claims, 33 Drawing Sheets

(51) Int. Cl.
*G06F 3/0484* (2013.01)
*G06F 3/0488* (2013.01)

(52) U.S. Cl.
CPC .... *G06F 3/04883* (2013.01); *H04M 1/72583* (2013.01); *H04M 2250/52* (2013.01); *H04M 2250/58* (2013.01)

(56) References Cited

U.S. PATENT DOCUMENTS

| | | | |
|---|---|---|---|
| 9,547,644 B2* | 1/2017 | Cuthbert | G06F 17/289 |
| 2001/0032070 A1* | 10/2001 | Teicher | G06F 17/28 704/2 |
| 2005/0197825 A1* | 9/2005 | Hagerman | G06F 17/289 704/2 |
| 2006/0083431 A1* | 4/2006 | Bliss | G06F 17/289 382/229 |
| 2007/0225964 A1* | 9/2007 | Wu | G06F 17/289 704/2 |
| 2008/0233980 A1* | 9/2008 | Englund | G06F 17/289 455/466 |
| 2009/0094016 A1 | 4/2009 | Mao | |
| 2009/0198486 A1* | 8/2009 | Chang | G06F 17/289 704/2 |
| 2010/0008582 A1* | 1/2010 | Kim | G06F 17/2863 382/177 |
| 2010/0278453 A1 | 11/2010 | King | |
| 2011/0066421 A1* | 3/2011 | Lee | G06F 17/289 704/2 |
| 2012/0088543 A1* | 4/2012 | Lindner | G06F 17/289 455/556.1 |
| 2012/0130704 A1* | 5/2012 | Lee | G06F 17/289 704/3 |
| 2014/0022386 A1* | 1/2014 | Zhi | G06F 17/28 348/143 |
| 2014/0081619 A1* | 3/2014 | Solntseva | G06F 17/289 704/3 |
| 2014/0245123 A1 | 8/2014 | Pircher et al. | |
| 2014/0249798 A1* | 9/2014 | Sun | G06K 9/26 704/3 |
| 2015/0234812 A1* | 8/2015 | Vukosavljevic | G06F 17/289 704/2 |
| 2016/0301869 A1* | 10/2016 | Mitsunaga | G06F 17/28 |

* cited by examiner

FIG. 6
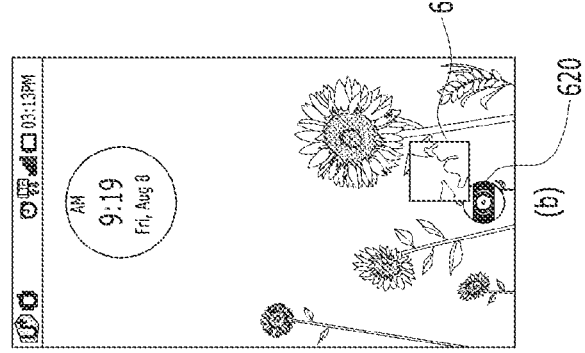
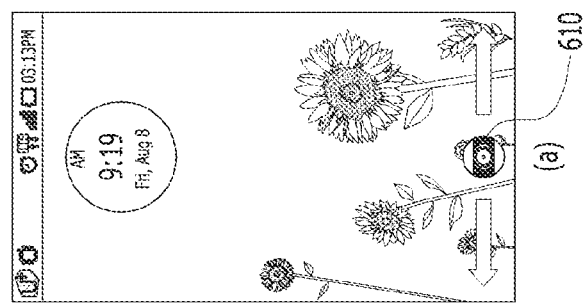

(a)　　　　　　　　　(b)

MOBILE TERMINAL AND CONTROLLING METHOD THEREOF

CROSS-REFERENCE TO RELATED APPLICATIONS

This application is the National Stage filing under 35 U.S.C. 371 of International Application No. PCT/KR2015/002864, filed on Mar. 24, 2015, which claims the benefit of earlier filing date and right of priority to Korean Application No. 10-2014-0178496, filed on Dec. 11, 2014, the contents of which are hereby incorporated by reference herein in their entirety.

TECHNICAL FIELD

The present invention relates to a mobile terminal, and more particularly, to a mobile terminal and controlling method thereof.

DESCRIPTION OF THE RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

A technology of translation using a translation application saved in a mobile terminal has been generalized already.

Recently, a technology of translating words included in an image captured through a camera or a technology of translating texts in an image has been introduced. Yet, in case of translating a text included in an image using a translation application of a mobile terminal, it is unable to translate the text included in a partial region of the image by selecting the partial region from the image. Instead, after determining whether the text exists for the whole image, all the texts existing in the image should be translated.

However, even if a text exists in a partial region of an image, it is determined whether texts exist in a whole region of the image, which may cause a problem that a text recognition rate is lowered. When a text included in an image is translated, it is necessary to do a translation in a manner of selecting a partial region from the image and then determining whether a text exists in the selected region only.

DISCLOSURE

Technical Problem

Accordingly, an object of the present invention is to address the above-noted and other problems.

One object of the present invention is to provide a mobile terminal, by which a recognized text is translated in a manner of selecting at least one region of an image obtained by a camera from a running screen of a translation application and then recognizing a text corresponding to the selected region.

Another object of the present invention is to provide a method of controlling a mobile terminal, by which a translation result of a recognized text is displayed on a running screen of a specific application in a manner of running a specific application including an image, activating a translation mode, displaying a GUI window for selecting at least one partial region of the running screen of the specific application, and then recognizing a text included in a part corresponding to the displayed GUI window.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to one embodiment of the present invention includes a camera, a display unit configured to display a preview image obtained by the camera, and a controller configured to detect a first command for entering a translation mode, output a GUI window for selecting at least one partial region of a text included in the preview image to the display unit in response to the detected first command, control the display unit to display a translation result of a text corresponding the GUI window on the preview image.

To further achieve these and other advantages and in accordance with the purpose of the present invention, as embodied and broadly described, a mobile terminal according to another embodiment of the present invention includes a display unit configured to display a running screen of a widget corresponding to a translation application on a partial region of a home screen, a camera configured to be activated in response to a selection of a specific icon included in the running screen, and a controller configured to control the display unit to output a preview image obtained by the activated camera within the running screen.

To further achieve these and other advantages and in accordance with the purpose of the present invention, as embodied and broadly described, a method of controlling a mobile terminal according to further embodiment of the present invention includes displaying a running screen of a specific application, the running screen including an image, detecting a first command for entering a translation mode, displaying a GUI window for selecting at least one partial region of the running screen on the running screen in response to the first command, detecting a second command for shifting the GUI window onto the image included in the running screen, recognizing a text included in a part corresponding to the GUI window in the image in response to the second command and translating the recognized text, and displaying a translation result of the recognized text on the running screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects

Accordingly, the present invention provides the following effects and/or features.

First of all, according to one embodiment of the present invention, the present invention can raise a recognition rate of a text existing in an image.

Secondly, according to another embodiment of the present invention, the present invention provides a translation result together with an additional information related to the translation result, thereby enhancing practicability of a translation application.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The present invention will become more fully understood from the detailed description given herein below and the accompanying drawings, which are given by illustration only, and thus are not limitative of the present invention, and wherein:

FIG. 6 is a diagram for examples of a method of running a translation application in a mobile terminal according to one embodiment of the present invention;

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
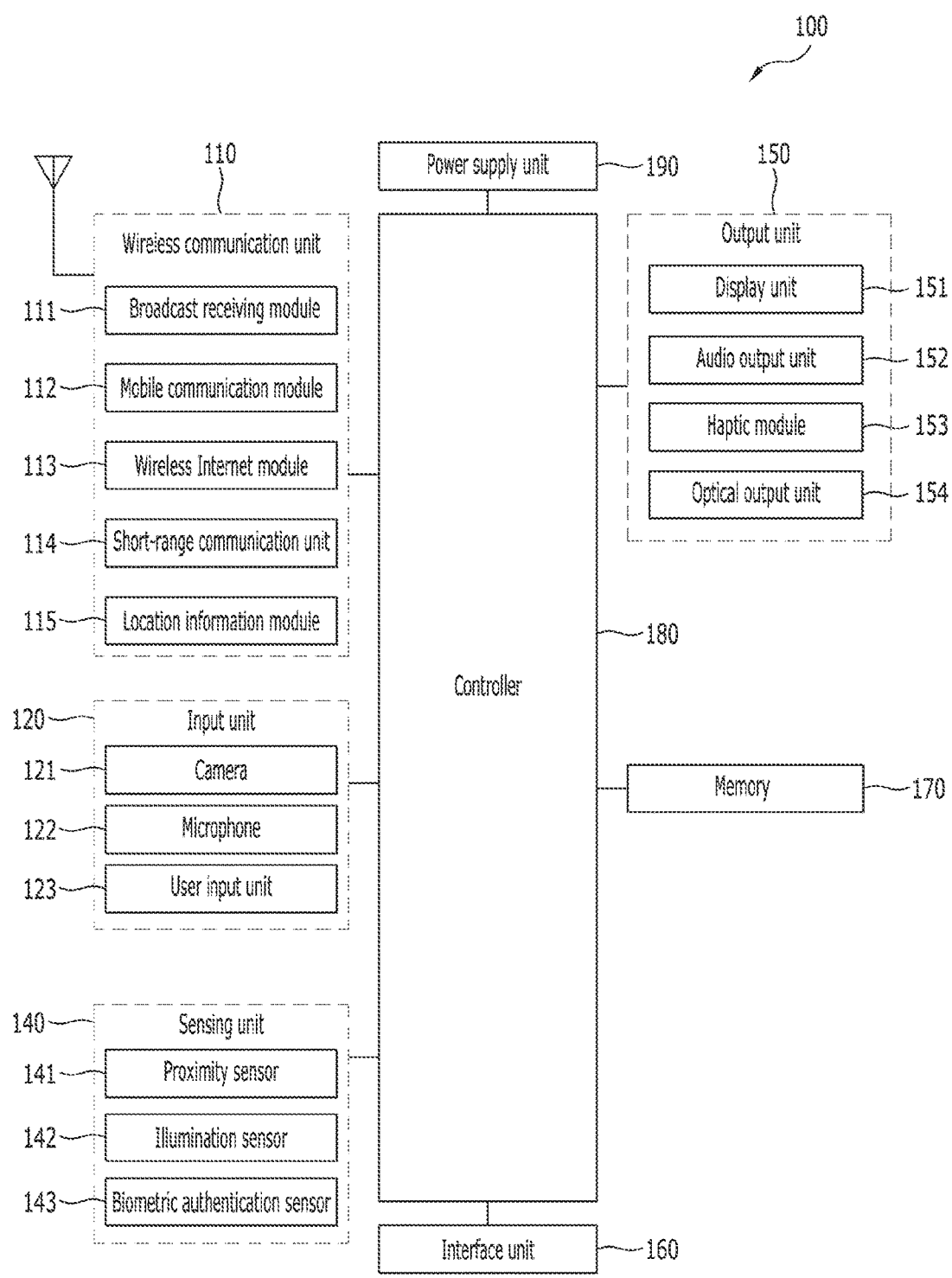
FIG. 1A is a block diagram of a mobile terminal in accordance with the present disclosure.
Figure 1B:
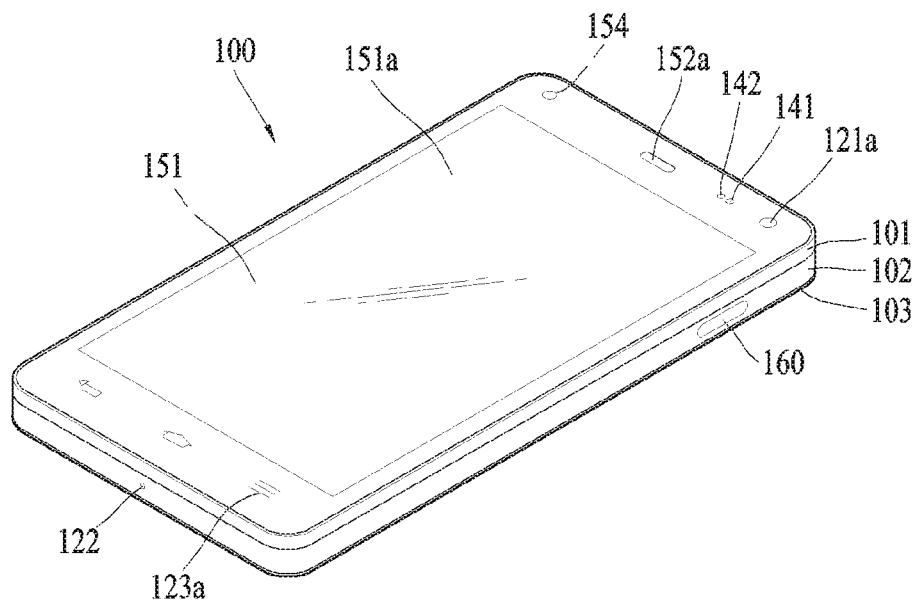
FIGS. 1B and 1C are conceptual views of one example of the mobile terminal, viewed from different directions.
Figure 1C:
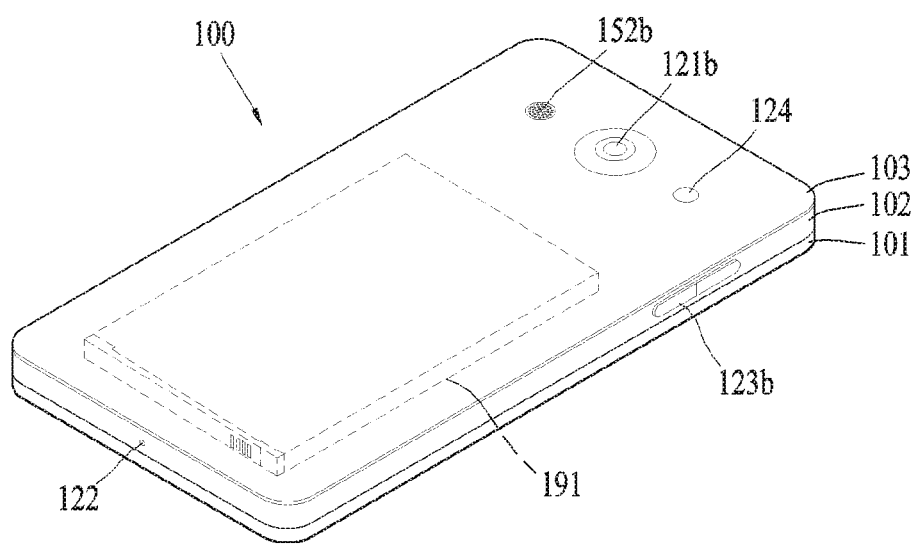

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast- Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
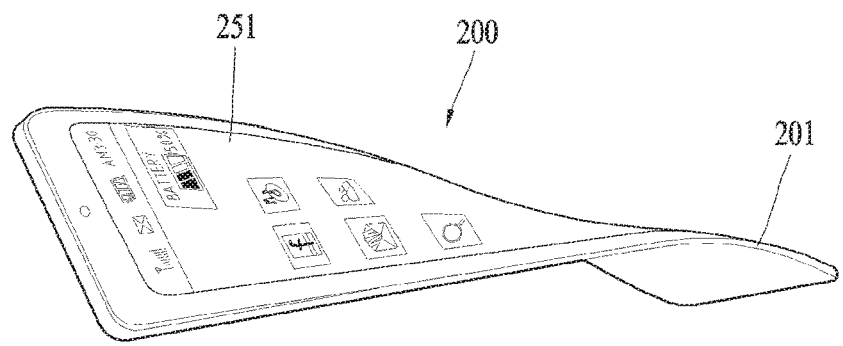
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
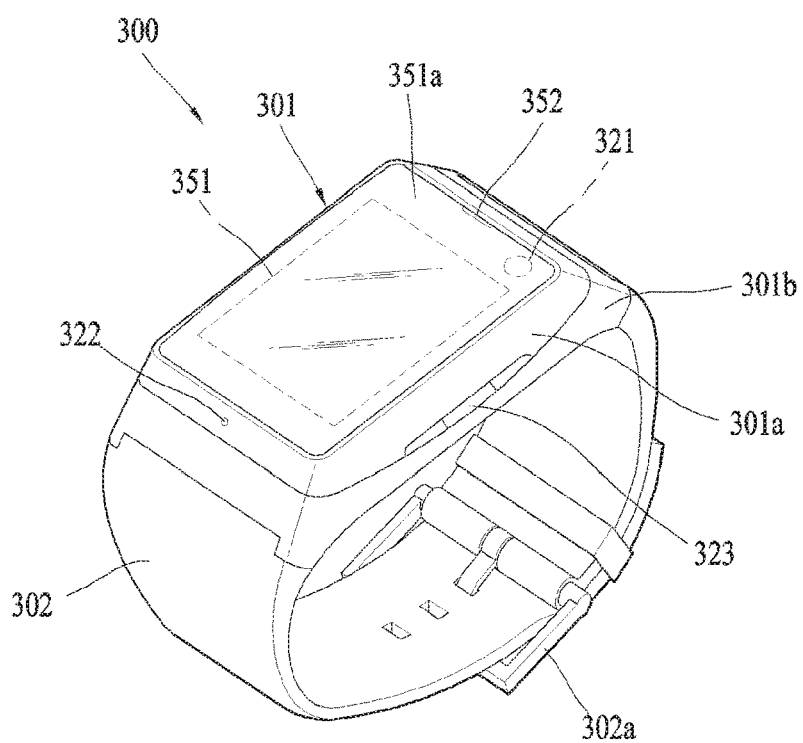
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
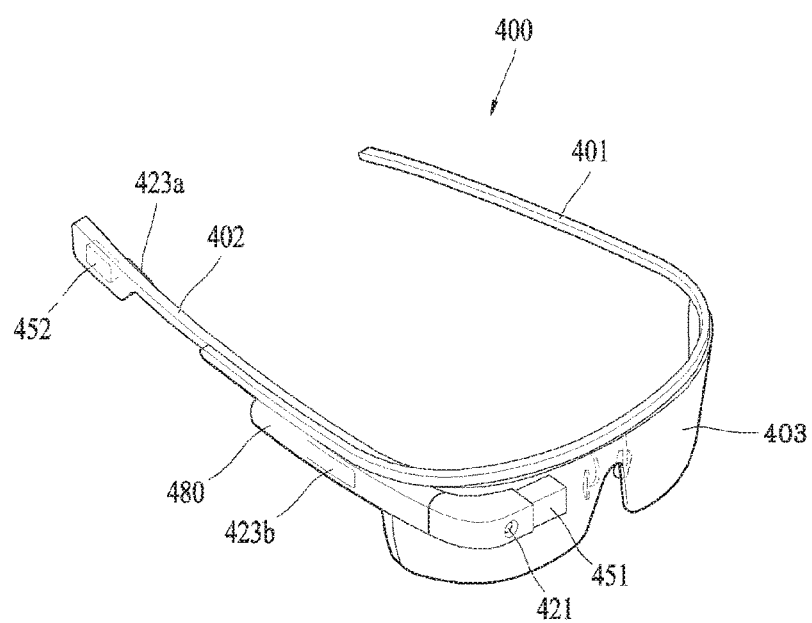
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following description, a method of utilizing a translation application in a mobile terminal 100 according to one embodiment of the present invention is explained with reference to FIGS. 5 to 33. A translation application may mean an application capable of translating such information appearing on a screen of the display unit 151 of the mobile terminal 100 as an image, a text or the like into a prescribed language. The translation application may include a native application installed since a market release of the mobile terminal 100, an application installed on updating an OS or a firmware, or an application installed by being separately downloaded by a user of the mobile terminal 100.

Figure 5:
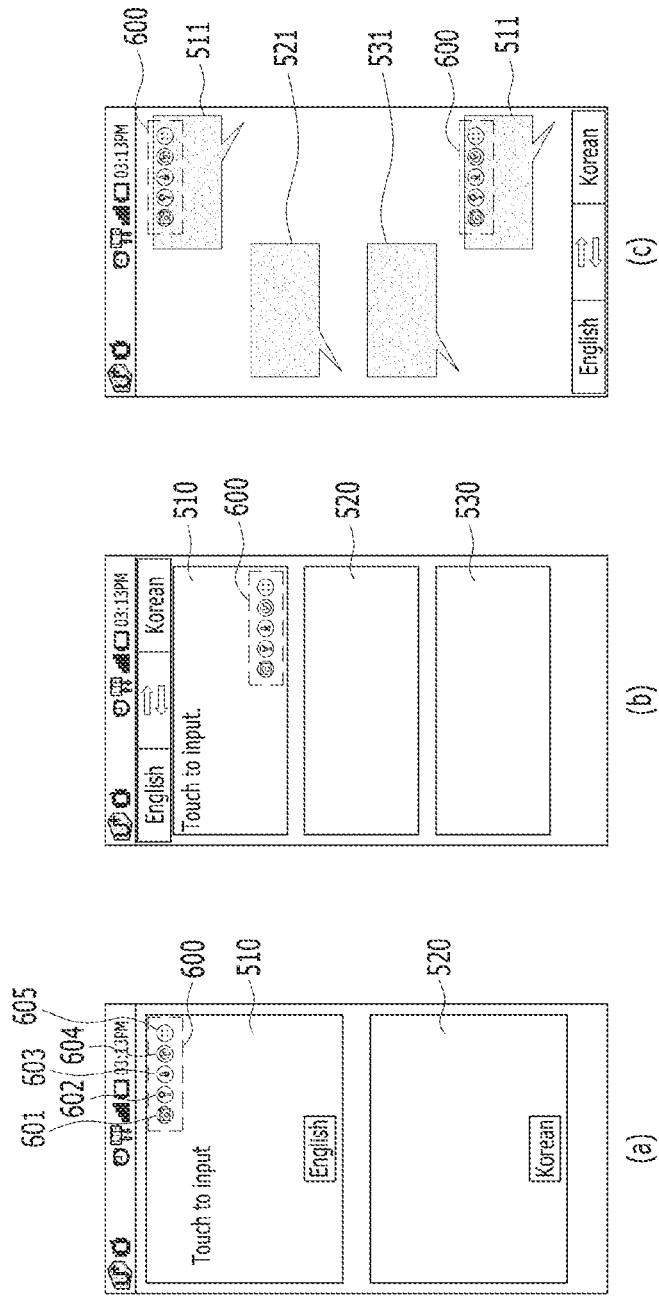
FIG. 5 is a diagram to describe examples of a template of a translation application in a mobile terminal according to one embodiment of the present invention.

FIG. 5 is a diagram to describe examples of a template of a translation application in a mobile terminal according to one embodiment of the present invention. According to the present embodiment, a template may mean a configuration of a running screen appearing when a translation application is run.

A user may be able to use a translation application by selecting a prescribed template from a plurality of templates preset for the translation application. For instance, the preset templates maybe configured as shown in FIGS. 5(a) to 5(c).

The controller 180 of the mobile terminal 100 can run a translation application using a template selected by a user from the templates shown in FIGS. 5(a) to 5(c).

The memory 170 storing a translation application may have stored the templates preset for the translation application already.

According to an embodiment, while the template shown in FIG. 5(a) is selected by a user, if the translation application is run, the controller 180 can control the display unit 151 to display a first region 510 and a second region 520.

Through the first region 510, the controller 180 can receive an input of one of a translation desired text, an image obtained by the camera 121, a user's handwriting, a file loaded from the memory 170, and a voice. Subsequently, the controller 180 can output a translation result of the translation desired text, the image obtained by the camera 121, the user's handwriting, the file loaded from the memory 170, or the voice, which was inputted through the first region 510, to the second region 520. In this case, the text may include letters (e.g., Korean, Russian, Chinese, English, etc.), numerals, special characters and the like. For clarity of the following description, a text is regarded as including letters (e.g., Korean, Russian, Chinese, English, etc.), numerals, special characters and the like.

In some cases, the controller 180 may output a user guide text (e.g., 'Touch to input.') to the first region 510.

The controller 180 can display icons 600 corresponding to prescribed functions of the translation application on the first region 510. In this case, the icons 600 may include at least one of an icon 601 corresponding to a function of activation of the camera 121, an icon 602 corresponding to a function of activation of the microphone 122, an icon 603 for obtaining a user's handwriting by detecting a touch input to the display unit 151, an icon 604 for loading a file previously saved in the memory 170, and an icon 605 for outputting a setting menu of the translation application. For clarity of the following description, the icons 600 corresponding to the prescribed functions of the translation application are regarded as including at least one of the icon 601 corresponding to the function of activation of the camera 121, the icon 602 corresponding to the function of activation of the microphone 122, the icon 603 for obtaining a user's handwriting by detecting a touch input to the display unit 151, the icon 604 for loading a file previously saved in the memory 170, and the icon 605 for outputting a setting menu of the translation application.

According to an embodiment, the controller 180 may output a screen for receiving an input of one of a translation desired text, an image obtained by the camera 121, a user's handwriting, a file loaded from the memory 170 and a voice and a corresponding translation result to the first region 510.

If a preset text is included in the translation result, the controller 180 may output a running screen of an application corresponding to the preset text among specific applications interworking with a translation mode or an additional information related to the preset text to the second region 520.

Meanwhile, if a user selects a template shown in FIG. 5(b), when a translation application is run, the controller 180 may output a first region 510, a second region 520 and a third region 530 to the running screen.

The controller 180 can output a screen, which is provided to receive an input of one of a text, an image obtained by the camera, a user's handwriting, a file loaded from the memory 170 and a voice, to the first region 510. The controller 180 may output a user guide text (e.g., 'Touch to input.') to the first region 510. The controller 180 may output icons 600 corresponding to prescribed functions of the translation application to the first region 510.

The controller 180 may output a translation result to the second region 520.

If a preset text is included in the translation result, the controller 180 may output a running screen of an application corresponding to the preset text among specific applications (e.g., an alarm application, a web browser, etc.) interworking with a translation mode or an additional information related to the preset text to the third region 530.

Meanwhile, if a template shown in FIG. 5(c) is selected by a user, the controller 180 may output a translation result using a conversational bubble. The user runs a translation application in a manner of making conversation with the mobile terminal 100, thereby feeling intimacy.

For instance, if a translation application is run, the controller 180 may have an input of one of a text, an image obtained by the camera, a user's handwriting, a file loaded from the memory 170 and a voice to a first conversational bubble 511. The controller 180 may arrange the icons 600 in the first conversational bubble 511. And, the controller 180 may output a translation result to a second conversational bubble 521.

In some cases, if a preset text is included in the translation result, the controller 180 may output a running screen of an application corresponding to the preset text among specific applications interworking with a translation mode or an additional information related to the preset text to a third conversational bubble 531.

The controller 180 may output the first conversation bubble 511 again to receive another input.

According to the present embodiment, if a translation application is run, various templates are utilized to enhance user convenience.

In the following description, examples of a method for accessing (or running) a translation application in the mobile terminal 100 according to one embodiment of the present invention are explained in detail with reference to FIGS. 6 to 9.

FIG. 6 is a diagram for examples of a method of running a translation application in a mobile terminal according to one embodiment of the present invention.

Referring to FIG. 6(a), when a screen lock is set in the display unit 151, if a command for activating the display unit 151 is detected, the controller 180 of the mobile terminal 100 activates the display unit 151 and is also able to output a screen corresponding to the screen lock to the display unit 151. In this case, the screen lock means a function of setting a security to make general functions of the mobile terminal unusable unless inputting a preset password through a touchscreen.

According to the present embodiment, the screen corresponding to the screen lock may include a first icon 610 for running a preset application. Through the first icon 610 included in the screen corresponding to the screen lock, a user is able to access the preset application despite that the screen lock is locked. For instance, if a command of touching and dragging the first icon 610 in a specific direction is detected, the controller 180 is able to run a translation application. In particular, if an input of touching and dragging the first icon 610 in a left direction is detected, the controller 180 can run the translation application without unlocking the screen lock. Moreover, if an input of touching and dragging the first icon 610 in a right direction is detected, the controller 180 can run a specific application (e.g., a camera application) corresponding to the detected input.

Meanwhile, referring to FIG. 6(b), when a screen lock is set in the display unit 151, if a command for activating the display unit 151 is detected, the controller 180 of the mobile terminal 100 activates the display unit 151 and is also able to output a screen corresponding to the screen lock to the display unit 151.

According to the present embodiment, if a translation required situation is recognized, the screen corresponding to the screen lock can display an icon 621 for running a translation application and an icon 620 for running a camera application in a manner that the former icon 621 overlaps the latter icon 620 in part. For instance, the controller obtains a coordinate information through the position location module 115 and is then able to check a current location of the mobile using the obtained coordinate information. If the controller 180 recognizes that the checked location corresponds to a preset location that requires a translation, the controller 180 can control the icon 621 for running the translation application to be displayed in a manner of overlapping a portion of the icon 620 for running the camera application.

In case of detecting a touch input of selecting the icon 620 for running the camera application, the controller 180 can run the camera application. In case of detecting a touch input of selecting the icon 621 for running the translation application, the controller 180 can run the translation application.

Yet, according to an embodiment, although the screen lock is not set up, if the controller 180 recognizes a translation required situation, the controller 180 can control the icon 621 for running the translation application to be displayed on a home screen in a manner of overlapping the icon 620 for running the camera application.

Meanwhile, referring to FIG. 6(c), if the controller 180 of the mobile terminal 100 detects a specific touch input to a preview image of a camera application, the controller 180 can enter a translation mode while the camera application is running. For instance, the specific touch input may include a touch input performed in a manner of applying a touch to a point on the preview image and then applying a drag to another point. In this case, the translation mode may mean a mode as follows. First of all, a translation application is run as a background while a specific application is running. Secondly, a translation of a translation required part is ready to be done within a running screen of the specific application using the translation application run as the background.

According to an embodiment, the touch input may include a command for selecting a translation desired part of a text included in a preview image. For instance, if a touch input is detected from a preview image of a camera application, the controller 180 can recognize a text within the touch input detected region.

Subsequently, the controller 180 translates the recognized text and is then able to display a translation result of the recognized text on the preview image.

According to the above-described embodiment, since the translation application can be run in various ways, the translation application can be run conveniently and easily.

Figure 7:
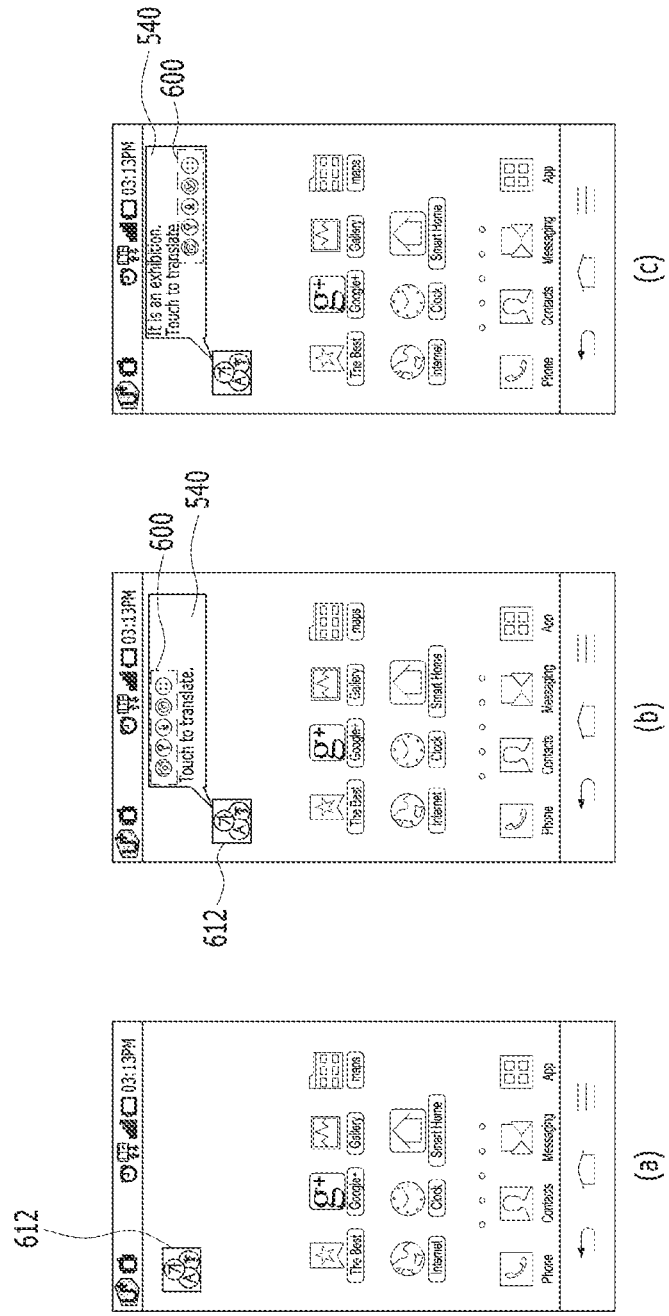
FIG. 7 is a diagram for another example of a method of running a translation application in a mobile terminal according to one embodiment of the present invention.

FIG. 7 is a diagram for another example of a method of running a translation application in a mobile terminal according to one embodiment of the present invention.

FIG. 7(a) shows one example of displaying an icon 612 for running a translation application according to the present embodiment on a home screen. FIG. 7(b) and FIG. 7(c) show examples of displaying a running screen 540 of a widget corresponding to a translation application according to the present embodiment on a partial region of a home screen.

Referring to FIG. 7(a), the controller 180 is able to display a third icon 612 corresponding to a translation application on a home screen. In particular, the controller 180 can control the third icon 612 to be fixed to a specific location on the home screen. The controller 180 can control the third icon 612 to fluidly move on the home screen.

If the controller 180 detects a touch input of selecting the third icon 612, the controller 180 can control the display unit 151 to display a running screen of the translation application.

Meanwhile, according to an embodiment, if the controller 180 detects a touch input of selecting the third icon 612, the controller 180 may control the display unit 151 to display a running screen 540 of a widget corresponding to a translation application on a partial region of the home screen. This is described in detail with reference to FIG. 7 (b) as follows.

Referring to FIG. 7(b), if the controller 180 detects a touch input to the third icon 612, the controller 180 can output a running screen 540 of a widget corresponding to a translation application to a partial region of a home screen. The controller 180 can display icons 600 corresponding to prescribed functions of the translation application on the running screen 540. According to an embodiment, the controller 180 may display the running screen 540 in form of a conversational bubble together with the third icon 612.

The controller 180 may display a user guide text related to a translation on the widget. For instance, the controller 180 can display such a user guide text as 'Touch to translate' on the widget.

According to an embodiment, if the controller 180 detects a touch input of selecting one of the icons 600 corresponding to the prescribed functions of the translation application, which are displayed on the widget, or a touch input of selecting the widget, the controller 180 can output a screen related to the prescribed function of the translation application to the running screen 540.

Meanwhile, referring to FIG. 7(c), if the controller 180 recognizes a translation required situation, the controller 180 may output a running screen 540 of a widget corresponding to a translation application in form of a conversational bubble together with the third icon 612. For instance, the controller 180 obtains a coordinate information through the position location module 115, checks a current location of the mobile using the obtained coordinate information, and is then able to recognize that the place corresponds to a preset location that requires a translation.

The controller 180 can display a message indicating a current location and a user guide text on the running screen 540. For instance, if the current location of the mobile corresponds to a translation required preset location (e.g., an exhibition located overseas) through the position location module 115, the controller 180 can display the running screen 540 on a partial region of the home screen.

The controller 180 displays icons 600 corresponding to prescribed functions of a translation application on the running screen 540 and is able to output a user guide text 'Touch to translate' to the running screen 540. The controller 180 creates a message indicating a current location using information on a current location of the mobile and is then able to output the created message (e.g., 'It is an exhibition.').

Meanwhile, the controller 180 may be able to run a translation application by displaying a running screen of a widget corresponding to the translation application on a partial region of a home screen. This is described in detail with reference to FIG. 8 as follows.

Figure 8:
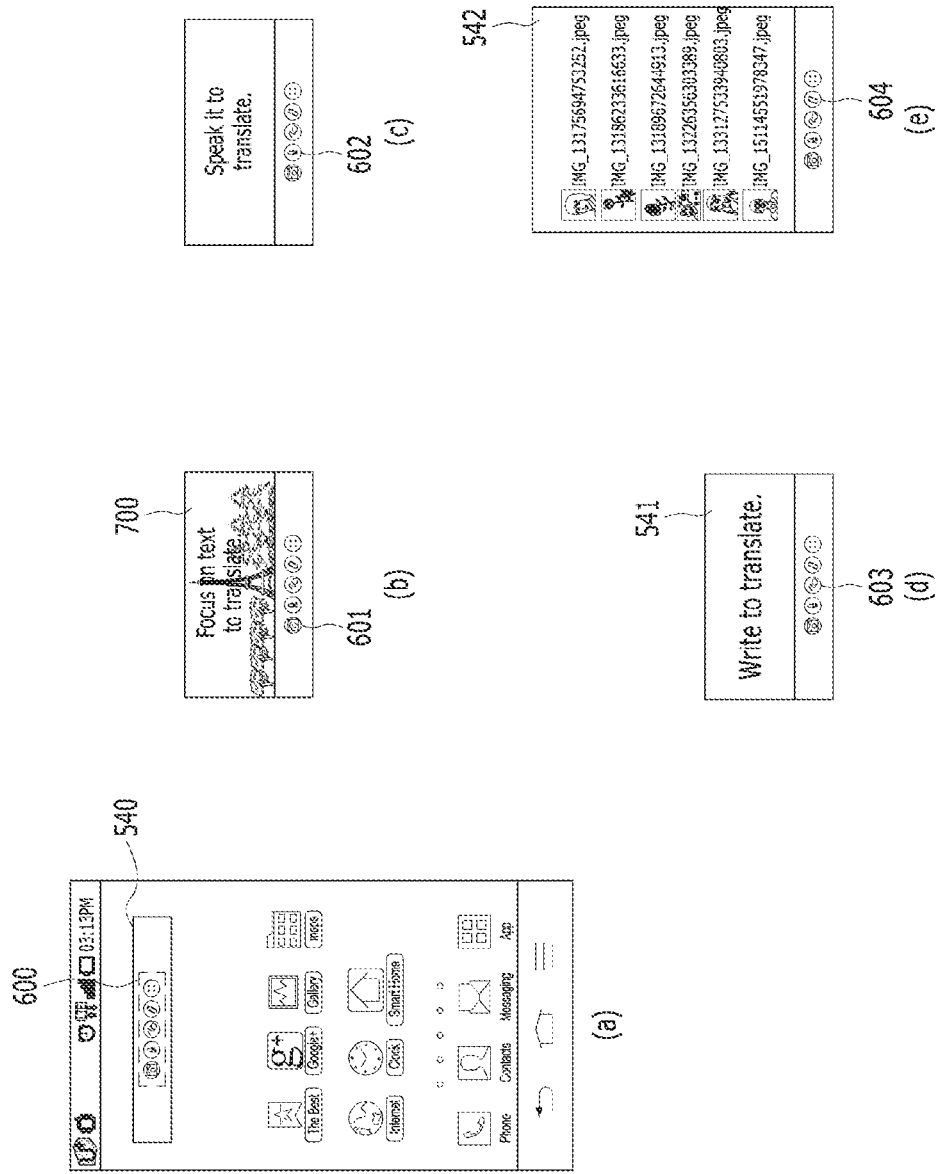
FIG. 8 is a diagram for further example of a method of running a translation application in a mobile terminal according to one embodiment of the present invention.

FIG. 8 is a diagram for further example of a method of running a translation application in a mobile terminal according to one embodiment of the present invention. The contents redundant with those described with reference to FIG. 7 are not described with reference to FIG. 8. And, the differences from FIG. 7 are mainly described with reference to FIG. 8 in the following.

Referring to FIG. 8(*a*), the controller 180 can display a running screen 540 of a widget corresponding to a translation application on a partial region of a home screen. The controller 180 can display icons 600 corresponding to prescribed functions of the translation application on the running screen 540.

Referring to FIG. 8(*b*), if the controller 180 detects a touch input of selecting an icon 601 corresponding to a function of activating the camera 121 from the icons 600 corresponding to the prescribed functions of the translation application, the controller 180 activates the camera 121 and then obtains a preview image 700.

Subsequently, the controller 180 can control the display unit 151 to display the obtained preview image 700 on a partial region of the home screen. For instance, the preview image 700 may be displayed above the icons 600 within the running screen 540.

The controller 180 can control a user guide message (e.g., 'Focus on a text to translate.') to be outputted to the preview image 700 in a manner of overlapping the preview image 700.

Referring to FIG. 8(*c*), the controller 180 can detect a touch input of selecting an icon 602 corresponding to a function of activating the microphone 122 from the icons 600. If the controller 180 detects the touch input of selecting the icon 602, the controller 180 can obtain a voice by activating the microphone 122. The controller 180 can output a user guide message (e.g., 'Speak to translate') to the running screen 540.

Referring to FIG. 8(*d*), the controller 180 can detect a touch input of selecting an icon 603 for obtaining a user's handwriting by detecting a touch input to the display unit 151 from the icons 600. If the controller 180 detects the touch input of selecting the icon 603, the controller 180 can display a window 541 for obtaining the user's handwriting above the running screen 540. And, the controller 180 can output a user guide message (e.g., 'Write to translate.' to the window 541.

According to an embodiment, the controller 180 recognizes a touch input from the window 541, recognizes a text corresponding to the touch input, and is then able to translate the recognized text.

Referring to FIG. 8(*e*), if the controller 180 detects a touch input of selecting an icon 604 for loading a file previously saved in the memory 170 from the icons 600, the controller 180 can load the previously saved file from the memory 170. For instance, if the controller 180 detects a touch input of selecting the icon 604, the controller 180 can output a window 542 for loading the previously saved file to a top end of the running screen 540.

Figure 9:
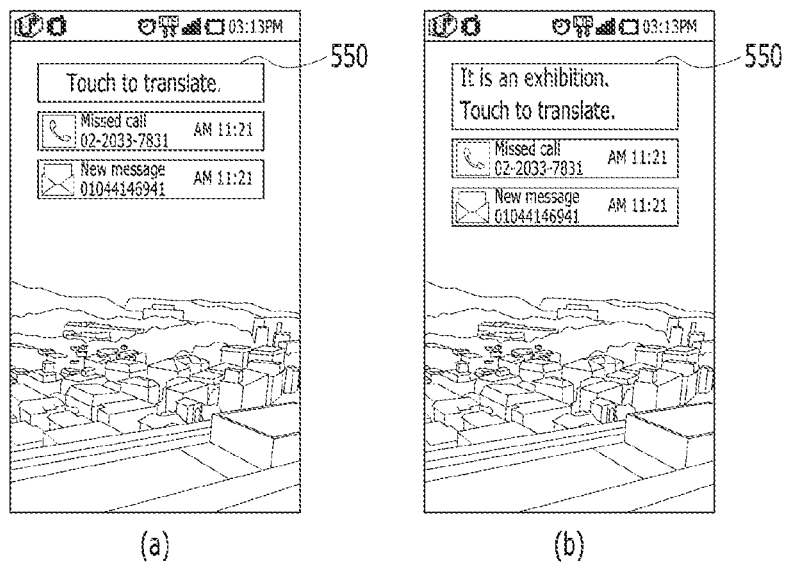
FIG. 9 is a diagram for one examples of a method of running a translation application through a notification window displayed on a screen corresponding to a screen lock in a mobile terminal 100 according to one embodiment of the present invention.

FIG. 9 is a diagram for one examples of a method of running a translation application through a notification window displayed on a screen corresponding to a screen lock in a mobile terminal 100 according to one embodiment of the present invention.

According to the present embodiment, while a screen lock is set for the display unit 151, if the controller 180 100 detects a command for activating the display unit 151, the controller 180 activates the display unit 151 and is then able to output a screen corresponding to the screen lock to the display unit 151.

Referring to FIG. 9(*a*), the controller 180 can display a notification window 550 of a translation application on a screen corresponding to a screen lock. In this case, the notification window 550 may include a user guide text (e.g., 'Touch to translate.'). In this case, the screen lock means to set up a security to prevent general functions of the mobile terminal 100 from being usable unless inputting a preset password through a touchscreen.

If the controller 180 detects a touch input of selecting the notification window 550, while the screen lock is not unlocked, the controller 180 can run a translation application.

Meanwhile, referring to FIG. 9(*b*), if the controller 180 recognizes a translation required situation, the controller 180 can display a notification window 550 of a translation application on a screen corresponding to a screen lock. And, the controller 180 can display a message indicating a current location and a user guide text on the notification window 550. For instance, the controller 180 obtains a coordinate information through the position location module 115, checks a current location of the mobile using the obtained coordinate information, and is then able to recognize that the place corresponds to a preset location that requires a translation. If the current location of the mobile corresponds to a translation required preset location (e.g., an exhibition located overseas) through the position location module 115, the controller 180 can display the notification window 550 on a screen corresponding to the screen lock. And, the controller 180 can output a user guide text 'Touch to translate' to the notification window 550. Moreover, the controller 180 creates a message indicating a current location using information on a current location of the mobile and is then able to output the created message (e.g., 'It is an exhibition.').

If the controller 180 detects a touch input of selecting the notification window 550, while the screen lock is unlocked, the controller 180 can run a translation application.

According to the above-described embodiment, since a translation application can be easily run, it is advantageous in that user's convenience can be enhanced.

In the following description, examples for a method of performing a translation using a translation application in a mobile terminal 100 according to one embodiment of the present invention are explained in detail with reference to FIGS. 10 to 17.

Figure 10:
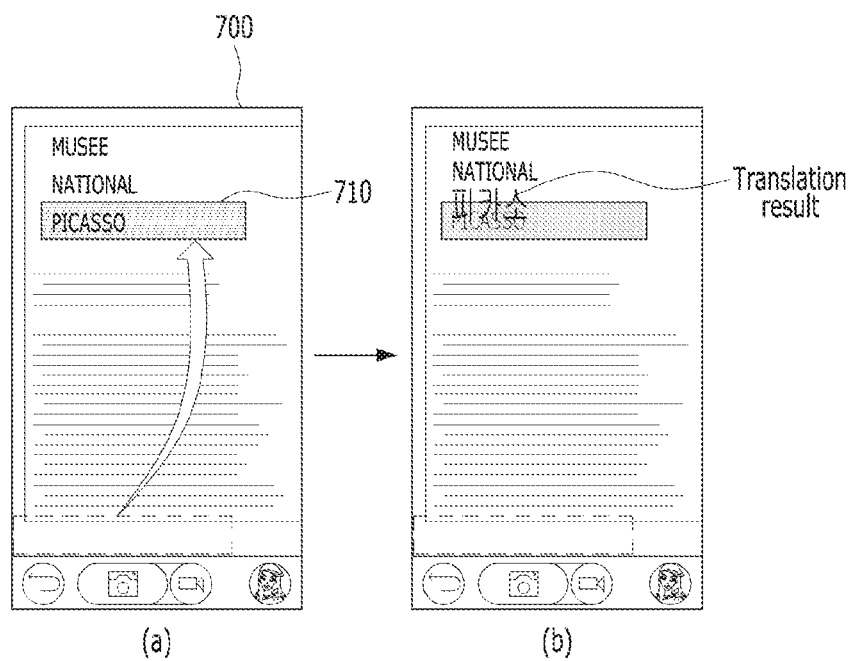
FIG. 10 is a diagram to describe one example of doing a translation using a preview image obtained by a camera 121 in a mobile terminal according to one embodiment of the present invention.

FIG. 10 is a diagram to describe one example of doing a translation using a preview image obtained by a camera 121 in a mobile terminal according to one embodiment of the present invention.

According to the present embodiment, the controller 180 can enter a translation mode in response to a preset command on a running screen of a camera application. If the preset command is detected, the controller 180 runs a translation application and is output a GUI indicating that the translation mode has been entered to the running screen (e.g., a preview image) of the camera application.

Referring to FIG. 10(a), if the controller 180 detects a first command for entering a translation mode from a running screen of a camera application, the controller 180 can display a GUI window 710, which is provided to select at least one partial region of the running screen, on the running screen. For instance, if a translation mode enter menu is selected from setting menus of the camera application, the controller 180 can display the GUI window 710 on a partial region of a preview image 700 obtained by the camera 121. If a translation desired text is included in the preview image 700 obtained by the camera 121, a user selects the translation mode enter menu, whereby a translation mode can be entered conveniently.

If the controller 180 detects a command for shifting the GUI window 710, the controller 180 can shift a location of the GUI window 710 on the preview image 700 in response to the detected command. For instance, the command for shifting the location of the GUI window 710 may include a touch input performed in a manner of applying a touch to a point of the GUI window 710 and then applying a drag to another point of the preview image 700.

According to an embodiment, if the controller 180 detects the first command for entering the translation mode from the running screen of the camera application, the controller 180 recognizes a text in the preview image 700 and is then able to directly display the GUI window 710 on the text included in the preview image 700.

The controller 180 can recognize a text included in a part corresponding to the location shifted GUI window 710. For instance, if the location of the GUI window 710 is shifted to a region at which a text 'PICASSO' is located within the preview image 700, the controller 180 can recognize the text 'PICASSO'.

Yet, according to an embodiment, if a translation application saved in the memory 170 is run, the controller 180 may recognize a text in the preview image 700 without directly displaying the GUI window 710 on the running screen. If at least one portion of the text is not recognized, the controller 180 displays the GUI window 710 on the unrecognized text of the preview image 700 and may re-recognize the text included in the GUI window 710.

Meanwhile, referring to FIG. 10(b), the controller 180 can display a translation result of the recognized text on the preview image 700. For instance, the controller 180 can control the translation result to be displayed on the recognized text 'PICASSO' in a manner of overlapping the text 'PICASSO'.

An algorithm for translating the recognized text may be saved in the memory 170 in advance.

According to an embodiment, the controller 180 may share the obtained preview image 700 and the translation result with an external device. If a command for sharing the translation result with an external device is detected, the wireless communication unit 110 searches for external devices capable of wireless communication, connects a wireless communication with the external device selected by a user from the searched external devices, and is then able to transmit the obtained preview image 700 and the translation result to the wireless communication connected external device, under the control of the controller 180. According to the present embodiment, the wireless communication unit 110 may include at least one of a short range communication module, a wireless internet module and a mobile communication module.

Meanwhile, according to the present invention, the controller 180 may rotate the GUI window, copy the GUI window, or change a form of the GUI window. This is described in detail with reference to FIG. 11 and FIG. 12 as follows.

Figure 11:
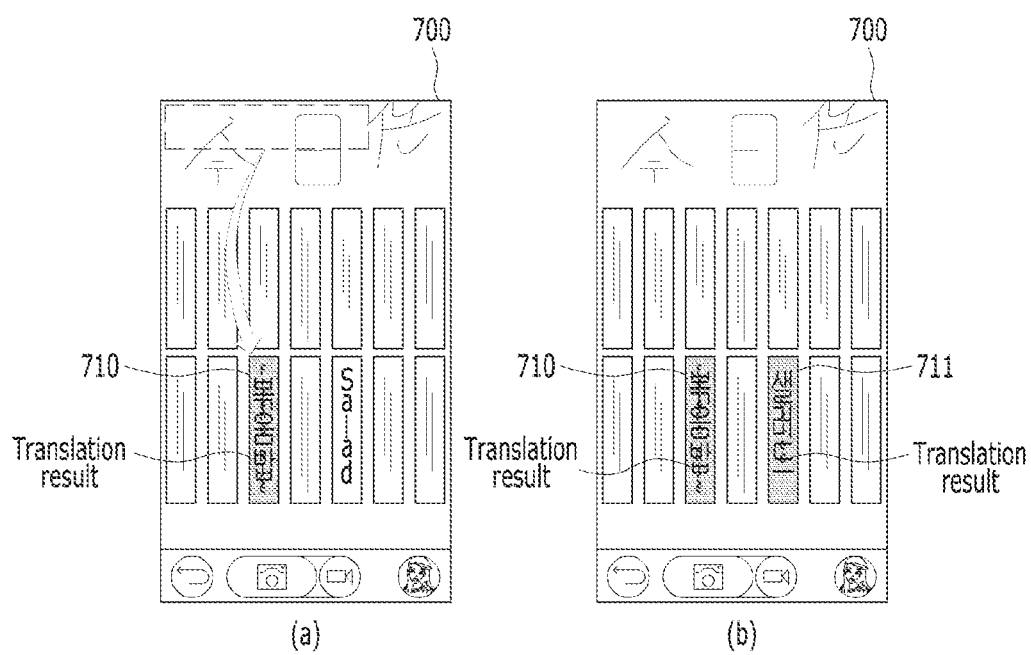
FIG. 11 is a diagram to describe a method of rotating or copying a GUI window for selecting at least one partial region of a preview image in a mobile terminal according to one embodiment of the present invention.

FIG. 11 is a diagram to describe a method of rotating or copying a GUI window for selecting at least one partial region of a preview image in a mobile terminal according to one embodiment of the present invention. Regarding FIG. 11, the contents redundant with the former description with reference to FIG. 10 shall not be described again but the following description shall be made centering on the differences from the former description with reference to FIG. 10.

Referring to FIG. 11(a), the controller 180 can rotate a GUI window 710 for selecting at least one partial region of a preview image obtained by the camera 121. For instance, if the controller 180 detects a touch input performed in a manner of applying a touch to two points of the GUI window 710 and then applying a drag by drawing a circle, the controller 180 can rotate the GUI window 710 on the preview image 700.

The controller 180 recognizes a text included in a part corresponding to the rotated GUI window 710 and is then able to display a translation result of the recognized text on the preview image 700. In case of displaying the translation result, the controller 180 can arrange the translation result in a direction of the arrangement of the recognized text. For instance, the controller 180 can control the translation result to be displayed in a manner of overlapping the text 'Fried Rice' included in the part corresponding to the rotated GUI window 710.

Meanwhile, referring to FIG. 11(b), if the controller 180 detects a command for copying the GUI window 710 to select a plurality of regions in the preview image 700 obtained by the camera 121, the controller 180 creates a plurality of the GUI windows 710 and is then able to output the created GUI windows 719 on the preview image 700. In this case, the copy of the GUI window may mean a process for creating and displaying another GUI window for selecting at least one partial region of the preview image 700 as well as the GUI window 710. For instance, if the controller 180 detects a touch input of selecting a prescribed point of the GUI window 710 over a predetermined time, the controller 180 creates one more GUI window and is then able to display the created one more GUI window on the preview image 700.

The controller 180 recognizes the text included in the part corresponding to the GUI window 710 and a text included in a part corresponding to the copied GUI window 711 and is then able to translate the recognized texts. The controller 180 can display translation results of the recognized texts on the preview image 700. In case of displaying the translation results, the controller 180 can arrange the translation results in directions of the arrangements of the recognized texts, respectively. For instance, the controller 180 can control the translation results to be displayed in a manner of overlapping the text 'Fried Rice' recognized through the GUI window 710 and a text 'Salad' recognized through the copied GUI window 711, respectively.

According to the above-described embodiment, by changing a direction of a GUI to match a direction of a text to translate, the corresponding text can be translated. If at least two texts exist in an image, a plurality of texts in the image can be selectively translated.

Figure 12:
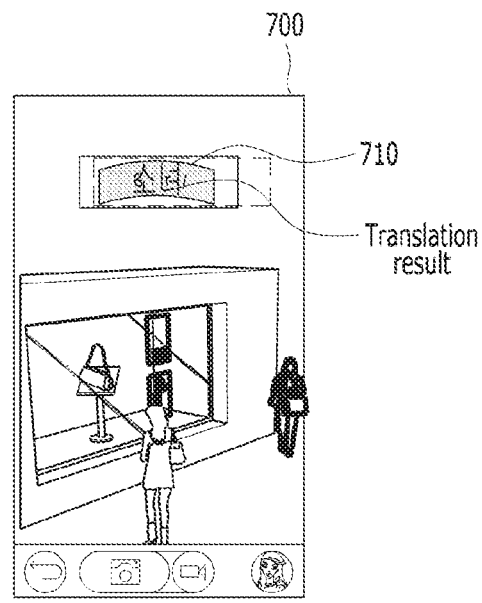
FIG. 12 is a diagram to describe a method of changing a form of a GUI window for selecting at least one partial region of a preview image in a mobile terminal according to one embodiment of the present invention.

FIG. 12 is a diagram to describe a method of changing a form of a GUI window for selecting at least one partial region of a preview image in a mobile terminal according to one embodiment of the present invention. Regarding FIG. 12, the contents redundant with the former description with reference to FIG. 10 or FIG. 11 shall not be described again but the following description shall be made centering on the differences from the former description with reference to FIG. 10 or FIG. 11.

Referring to FIG. 12, if the controller 180 detects a command for changing a form of a GUI window 710 for selecting at least one partial region from a preview image 700 obtained by the camera 121, the controller 180 can change a form of the GUI window 710. In this case, the change of the form of the GUI window 710 may mean that at least one of a shape and a size of the GUI window 710. For instance, if the controller 180 detects a touch input performed in a manner of applying a touch to two points of the GUI window 710 and then applying a drag in and out, the controller 180 can change a size of the GUI window 710. If the controller 180 detects a touch input performed in a manner of applying a touch to a point located at the center of the GUI window 710 over a predetermined time and then applying a drag in a top direction, the controller 180 can change the GUI window 710 into a curved shape.

Based on the shape of the GUI window 710, the controller 180 can recognize a text included in the GUI window 710. The controller 180 translates the recognized text and is then able to display a result of the translation on the preview image 700. In case of displaying the translation result, the controller 180 can arrange the translation result in a direction in which the recognized text is arranged. For instance, if the shape of the GUI window 710 includes a curve, the controller 180 can recognize the text 'girl' in a curve direction based on the shape. The controller 180 can control the translation result of the recognized text to be displayed in a manner of overlapping the recognized text. An algorithm related to a method of recognizing a text based on a shape of the GUI window 710 may be saved in the memory 170 in advance.

According to the above-described embodiment, it is advantageous in that a recognition rate of a text written as a curve in an image can be raised.

Figure 13:
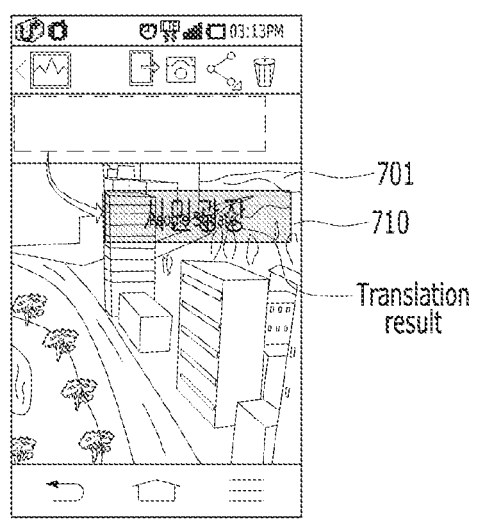
FIG. 13 is a diagram to describe a method of loading and translating an image previously saved in a memory 170 in a mobile terminal according to one embodiment of the present invention.

FIG. 13 is a diagram to describe a method of loading and translating an image previously saved in a memory 170 in a mobile terminal according to one embodiment of the present invention. Regarding FIG. 13, the contents redundant with the former description with reference to one of FIGS. 10 to 12 shall not be described again but the following description shall be made centering on the differences from the former description with reference to one of FIGS. 10 to 12.

Referring to FIG. 13, while an image 701 previously saved in the memory 170 is displayed on the display unit 151, the controller 180 can detect a first command for entering a translation mode. If the controller 180 detects the first command for entering the translation mode, the controller 180 can output a GUI window 710, which is provided to select at least one partial region of a running screen, to the display unit 151.

If the controller 180 detects a second command for shifting the GUI window 710 to a text located part within the image 701, the controller 180 can shift the GUI window 710 in response to the second command.

According to an embodiment, when the controller 180 outputs the GUI window 710 to the display unit 151, the controller 180 may control the GUI window 710 to be located on the image 701 to correspond to a text included in the image 701.

The controller 180 recognizes a text included in a part corresponding to the location shifted GUI window and is then able to display a translation result of the recognized text on a running screen of the image 701 saved in the memory. For instance, the controller 180 can control the translation result to be displayed on the image 701 in a manner of overlapping the text 'People Square' of the part corresponding to the location shifted GUI window 710.

And, the controller 180 may share the image 701 previously saved in the memory and the translation result with an external device. If a command for sharing the translation result with an external device is detected, the wireless communication unit 110 searches for external devices capable of wireless communication and is then able to connect a wireless communication with the external device selected by a user from the searched external devices, under the control of the controller 180. Moreover, the controller 180 can transmit the image 701 previously saved in the memory or an image photographed through the camera 121 and the translation result to the wireless communication connected external device. According to the present embodiment, the wireless communication unit 110 may include at least one of a short range communication module, a wireless internet module and the like.

Figure 14:
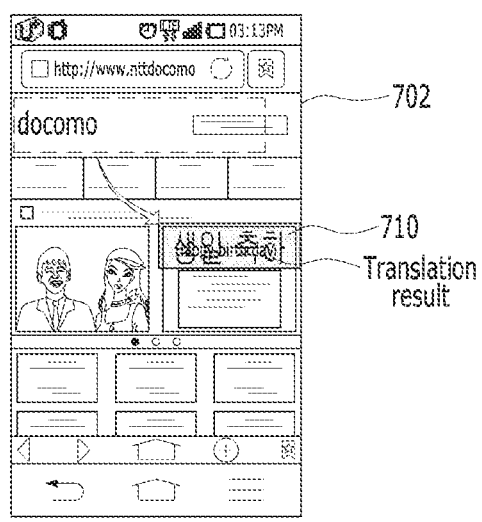
FIG. 14 is a diagram to describe a method of translating an image included in a web browser in a mobile terminal according to one embodiment of the present invention.

FIG. 14 is a diagram to describe a method of translating an image included in a web browser in a mobile terminal according to one embodiment of the present invention. Regarding FIG. 14, the contents redundant with the former description with reference to one of FIGS. 10 to 12 shall not be described again but the following description shall be made centering on the differences from the former description with reference to one of FIGS. 10 to 12.

Referring to FIG. 14, if the controller 180 detects a first command for entering a translation mode from a web browser running screen 702, the controller 180 can display a GUI window 710, which is provided to select at least one partial region of the web browser running screen 702, on the running screen.

If the controller 180 detects a second command for shifting the GUI window 710 onto an image included in the running screen 702, the controller 180 can shift the GUI window 710 in response to the second command. For instance, the second command may include a touch input performed in a manner of applying a touch to a point on the image included in the running screen 702 and then applying a drag to another point.

The controller 180 recognizes a text in the image included in a part corresponding to the location shifted GUI window 710 and is then able to display a translation result of the recognized text on the image. For instance, the controller 180 can recognize a text 'Happy Birthday' in the image of the part corresponding to the location shifted GUI window 710 in the web browser running screen including at least one or more images. And, the controller 180 is able to display a translation result of the recognized text on the running screen 702.

According to an embodiment, the controller 180 can share the running screen 702 of the web browser and the translation result with an external device. If a command for sharing the translation result with an external device is detected, the wireless communication unit 110 searches for external devices capable of wireless communication, connects a wireless communication with the external device selected by a user from the searched external devices, and is then able to transmit the running screen 702 of the web browser and the translation result to the wireless communication connected external device, under the control of the controller 180. According to the present embodiment, the wireless communication unit 110 may include at least one of a short range communication module, a wireless internet module and a mobile communication module.

Meanwhile, according to the present invention, if the controller 180 detects a touch input performed in a manner of applying a touch to a point and then applying a drag to another point, the controller 180 can recognize a text for a region corresponding to the touch input detected region. This is described in detail with reference to FIG. 15 as follows.

Figure 15:
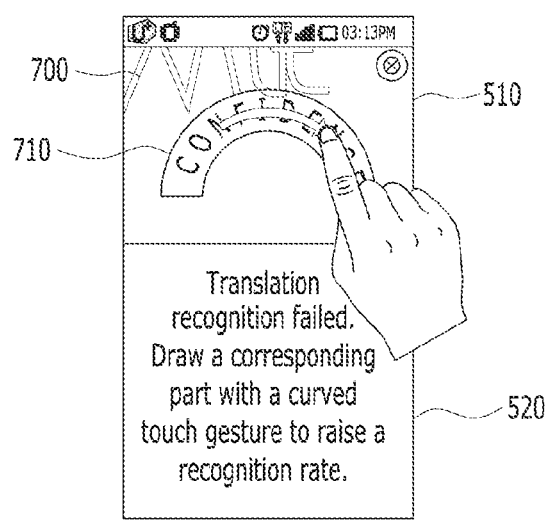
FIG. 15 is a diagram to describe a method of recognizing a text included in an image in a mobile terminal according to one embodiment of the present invention.

FIG. 15 is a diagram to describe a method of recognizing a text included in an image in a mobile terminal according to one embodiment of the present invention. Regarding FIG. 15, the contents redundant with the former description with reference to FIG. 5 shall not be described again but the following description shall be made centering on the differences from the former description with reference to FIG. 5.

First of all, in FIG. 5(*a*), the controller 180 can detect a touch input of selecting the icon 601 corresponding to the camera activating function from the icons 600 corresponding to the prescribed functions of the translation application. If the controller 180 detects a touch input of selecting the icon 601, the controller 180 activates the camera 121.

Referring to FIG. 15, the controller 180 can control the display unit 151 to display a preview image 700 obtained by the activated camera 121 on a first region 510. And, the controller 180 can recognize a text in the preview image 700.

Meanwhile, if the controller 180 is unable to recognize the text in the preview image 700 or fails to translate the text despite recognizing the text, the controller 180 can output a user guide message indicating the text recognition failure to a second region 520. For instance, if the controller 180 fails to recognize the text, the controller 180 can output a user guide message 'Translation recognition failed. Draw a corresponding part with a touch gesture to raise a recognition rate.' to the second region 520.

And, the controller 180 can detect a touch input performed in a manner of applying a touch to a point in the preview image 700 and then applying a drag to another point by maintaining the touch. If the controller 180 detects the touch input, the controller 180 can control the display unit 151 to display a GUI window 710, which is provided to select at least one partial region from a text, to correspond to the touch input detected region.

Based on a shape of the displayed GUI window 710, the controller 180 can recognize a text included in the GUI window 710. The controller 180 is then able to output a translation result of the recognized text to the display unit 151. The controller 180 translates the recognized text and is then able to display a result of the translation on the preview image 700. In case of displaying the translation result, the controller 180 can arrange the translation result in a direction in which the recognized text is arranged.

In some cases, the controller 180 may detect the touch input from a running screen of a camera application having entered a translation mode, a previously saved image leaded from the memory 170, or a running screen of a web browser having entered a translation mode. If the controller 180 detects the touch input, the controller 180 controls the display unit 151 to display the GUI window 710 to correspond to the touch input detected region, recognizes a text in an image included in the GUI window 710, translates the recognized text, and is then able to display the translated text.

According to the above-described embodiment, it is advantageous in that a recognition rate of a text written as a curve in an image can be raised. And, it is also advantageous in that user's convenience can be enhanced by displaying the GUI window 710 on a part corresponding to a touch input detected region.

Figure 16:
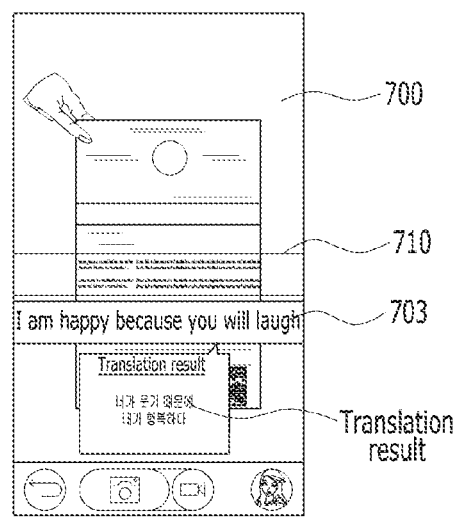
FIG. 16 is a diagram to describe a method of recognizing a text by enlarging a portion of a preview image obtained by a camera 121 in a mobile terminal according to one embodiment of the present invention.

FIG. 16 is a diagram to describe a method of recognizing a text by enlarging a portion of a preview image obtained by a camera 121 in a mobile terminal according to one embodiment of the present invention. Regarding FIG. 16, the contents redundant with the former description with reference to one of FIGS. 10 to 12 and FIG. 15 shall not be described again but the following description shall be made centering on the differences from the former description with reference to one of FIGS. 10 to 12 and FIG. 15.

According to the present embodiment, if the controller 180 fails to recognize at least one portion of a text in a preview image 700 obtained by the camera 121 in a translation application, the controller 180 can display a GUI window 710 for selecting a partial region of the preview image 700.

Referring to FIG. 16, the controller 180 enlarges a region corresponding to the GUI window 710 at a preset ratio and is then able to recognize a text included in the enlarged part of the image 703. In case of enlarging a part of the image corresponding to the GUI window 710, the controller 180 may display a message indicating that the image is being enlarged.

The controller 180 re-recognizes the text in the enlarged image 703 and is then able to display a translation result of the re-recognized text. In doing so, the translation result may be displayed below the enlarged image 703. Alternatively, the translation result may be displayed in a manner of overlapping the enlarged image 703.

Meanwhile, according to an embodiment, if a translation mode is entered while a camera application is running, the controller 180 recognizes a text included in a preview image 700 obtained by the camera 121 and is then able to display a GUI window 710, which is provided to select at least one partial region, on the preview image 700 to correspond to the recognized text. The controller 180 enlarges a region corresponding to the GUI window 710 at a preset ratio and is then able to re-recognize a text included in the enlarged part of the image 703. In case of enlarging a part of the image corresponding to the GUI window 710, the controller 180 may display a message indicating that the image is being enlarged.

And, the controller 180 is then able to display a translation result of the re-recognized text. In doing so, for instance, the controller 180 may display the translation result below the enlarged image 703. Alternatively, the controller 180 may control the translation result to be displayed in a manner of overlapping the enlarged image 703.

According to the above-described embodiment, it is advantageous in that a recognition rate of a text in small size can be raised.

Figure 17:
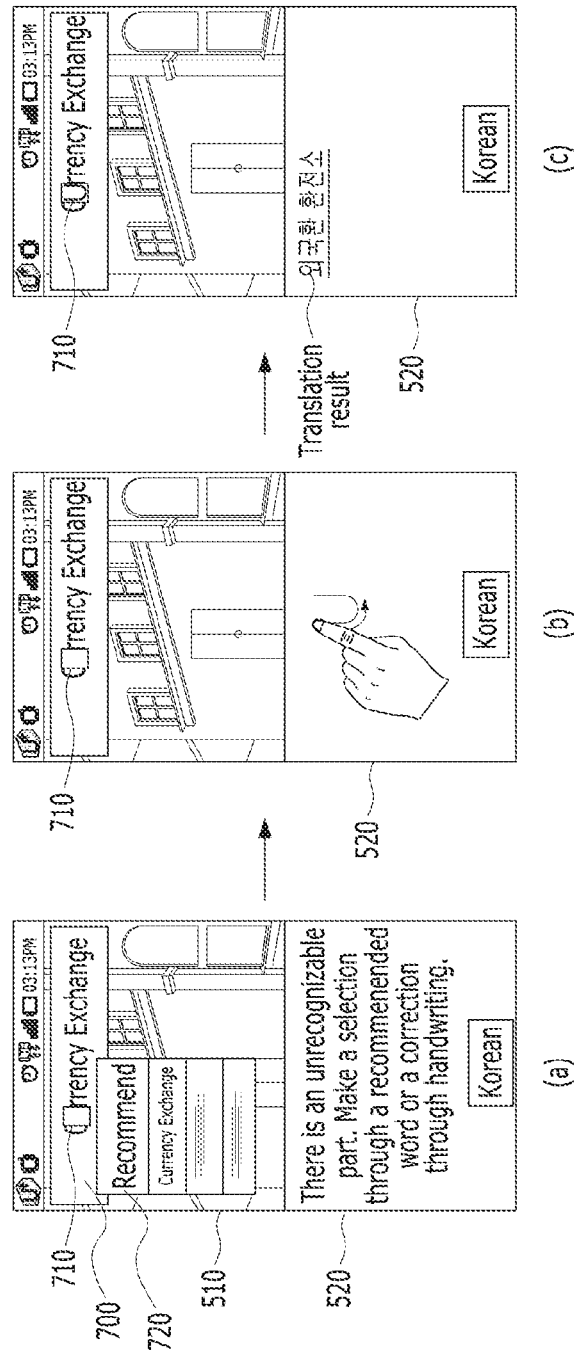
FIG. 17 is a diagram to describe a recognizing method by substituting a partial region of a text with an inputted pattern in a mobile terminal according to one embodiment of the present invention.

FIG. 17 is a diagram to describe a recognizing method by substituting a partial region of a text with an inputted pattern in a mobile terminal according to one embodiment of the present invention. Regarding FIG. 17, the contents redundant with the former description with reference to one of FIG. 5, FIGS. 10 to 12 and FIG. 15 shall not be described again but the following description shall be made centering on the differences from the former description with reference to one of FIG. 5, FIGS. 10 to 12 and FIG. 15.

Referring to FIG. 17(a), as a translation application is run, the controller 180 can activate the camera 121. The controller 180 displays a preview image 700 obtained by the activated camera on a first region 510. The controller 180 recognizes a text included in the preview image 700 and is then able to control the display unit 151 to output a translation result of the recognized text to a second region 520.

If at least one portion of the text in the preview image 700 is not recognized, the controller 180 can control the display unit 151 to display a GUI window for selecting at least one partial region from a running screen of the translation application.

The controller 180 detects a second command for selecting at least one partial region from the text and is then able to estimate a text of the region selected in response to the second command using the recognized text. The controller 180 is able to combine at least one or more estimated texts with the recognized text. And, the controller 180 is able to output a window 720 for selecting one of results from combining the estimated texts and the recognized text. For instance, if the controller 180 fails in recognizing a portion (e.g., alphabet 'u') of a text (e.g., 'currency exchange'), the controller 180 can display a text, which has a translation result from inputting a random text to the portion corresponding to 'u', on the window 720 only.

In some cases, if the controller 180 outputs the window 720 for selecting one of the estimated texts, the controller 180 may output a user guide message.

If the controller 180 detects an input of selecting a prescribed text from the estimated texts, the controller 180 can output a translation result of the selected text.

Meanwhile, referring to FIG. 17(b), the controller 180 may detect a third command for inputting a pattern for substituting the unrecognized portion. For instance, the controller 180 may detect the third command for inputting the pattern to the second region 520.

Subsequently, the controller 180 searches the memory 170 for a text corresponding to the detected pattern and is then able to recognize the detected pattern as the searched text. For instance, the controller 180 can detect a pattern that draws an alphabet 'u' by applying a touch to a point of the second region 520 and then applying a drag. If the controller 180 detects the pattern, the controller 180 can discover a text having the same pattern, i.e., the alphabet 'u' from the texts previously saved in the memory 170. The controller 180 can recognize the detected pattern as the searched alphabet 'u'. In particular, the controller 180 can substitute the text, which corresponds to the partial region selected by the second command, with the pattern inputted by the third command.

An algorithm for recognizing a detected pattern as a text may be saved in the memory 170 in advance.

Referring to FIG. 17(c), the controller 180 re-recognizes the text in the preview image 700 and is then able to output a translation result of the re-recognized text to the second region 520. In this case, the controller 180 can substitute the text included within the GUI window 710 with the pattern inputted by the third command. For instance, the controller 180 recognizes the pattern as an alphabet 'u' and is then able to input the alphabet 'u' to the GUI window 710. Subsequently, the controller 180 re-recognizes the text in the preview image 700 as 'Currency Exchange' and is then able to output a translation result of the re-recognized text to the second region 520.

According to the above-described embodiment, in case of failing in a text recognition due to an error of a specific part (e.g., a case that a portion of a text in a preview image is blocked, a case that a portion of a text in a preview image is erased, etc.), the present invention can output a translation result by receiving an input of a recognition failed text, thereby enhancing user's convenience.

Meanwhile, according to the present invention, the controller 180 can output a translation result. If a preset text is included in the translation result, the controller 180 can display an additional information related to the preset text together with the translation result. Moreover, if the preset text is included in the translation result, the controller 180 may be able to display a running screen of an application, which corresponds to the preset text among specific applications interworking with a translation mode, together with the translation result. This is described in detail with reference to FIGS. 18 to 27 as follows.

Figure 18:
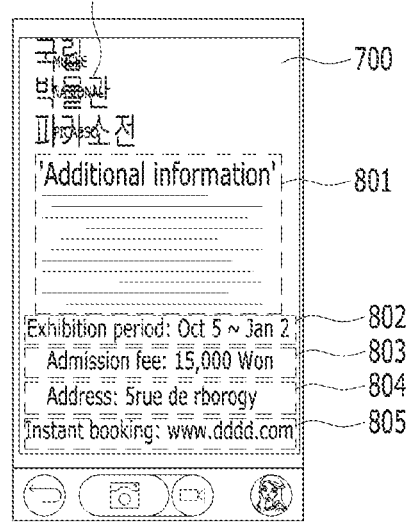
FIG. 18 is a diagram to describe one example of outputting a translation result and an additional information and then running an application corresponding to a selected additional information in case of detecting a touch input of selecting the additional information in a mobile terminal according to one embodiment of the present invention.

FIG. 18 is a diagram to describe one example of outputting a translation result and an additional information and then running an application corresponding to a selected additional information in case of detecting a touch input of selecting the additional information in a mobile terminal according to one embodiment of the present invention. Regarding FIG. 18, the contents redundant with the former description with reference to one of FIGS. 10 to 12 and FIG. 15 shall not be described again but the following description shall be made centering on the differences from the former description with reference to one of FIGS. 10 to 12 and FIG. 15.

Referring to FIG. 18, the controller 180 recognizes a text in a preview image 700. If a preset text is included in a translation result of the recognized text, the controller 180 can search for information related to the text using a web browser. Subsequently, using a search result of the web browser, the controller 180 can extract additional information. In this case, the additional information may mean the information related to the translation result. For instance, if a preset text (e.g., exhibition) is included in the translation result, the controller 180 can search for the translation result using the web browser. The controller 180 is then able to extract the additional information by searching for at least one of an exhibition period of works exhibited on the corresponding museum, an address of the corresponding museum, an address of a webpage related to the corresponding museum, an entrance fee of the corresponding museum, and a description of the translation result.

The controller 180 can output the extracted additional information together with the translation result. For instance, the controller 180 extracts the content related to translation result (e.g., exhibition) corresponding to the description for the translation result from the extracted additional information and is then able to output the extracted content to a first region 801. The controller 180 extracts information on the exhibition period of the works exhibited in the corresponding museum from the extracted additional information and is then able to output the extracted information to a second region 802. The controller 180 can output information on an entrance fee of the corresponding museum in the extracted additional information to a third region 803. The controller 180 can output information on an address of the corresponding museum in the extracted additional information to a fourth region 804. And, the controller 180 can output information on an internet address related to a ticket booking of the corresponding museum in the search result to a fifth region 805.

According to an embodiment, if the controller 180 detects a touch input to one of the additional information outputted together with the translation result, the controller 180 can run an application corresponding to the additional information. For instance, if the controller 180 detects a touch input to the first region 801, the controller 180 runs a web browser and is then able to access an internet address from which a content written in the first region 801 is found. For another instance, if the controller 180 detects a touch input to the fifth region 805, the controller 180 runs a web browser and is then able to access an internet address related to the ticket booking of the corresponding museum. For another instance, if the controller 180 detects a touch input to the second region 802, the controller 180 can run a schedule management application. And, the controller 180 is able to add a schedule related to the exhibition period of the works exhibited in the corresponding museum to the schedule management application. In this case, an algorithm for adding a schedule to the schedule management application based on information on the exhibition period may be saved in the memory 170 in advance. For further instance, if the controller 180 detects a touch input to the fourth region 804, the controller 180 runs a map application and is then able to output a screen of finding the address of the corresponding museum within the map application. This shall be described in detail with reference to FIG. 21 later.

An algorithm for extracting additional information using the search result and an algorithm for running an application corresponding to the additional information may be saved in the memory 170 in advance.

According to an embodiment, the controller 180 may share the additional information and the translation result with an external device. If a command for sharing the translation result and the additional information with the external device is detected, the wireless communication unit 110 searches for external devices capable of wireless communication. The controller 180 connects a wireless communication with the external device selected by a user from the searched external devices and is then able to transmit the preview image 700, the translation result and the additional information to the wireless communication connected external device, under the control of the controller 180. According to the present embodiment, the wireless communication unit 110 may include at least one of a short range communication module, a wireless internet module and a mobile communication module.

Figure 19:
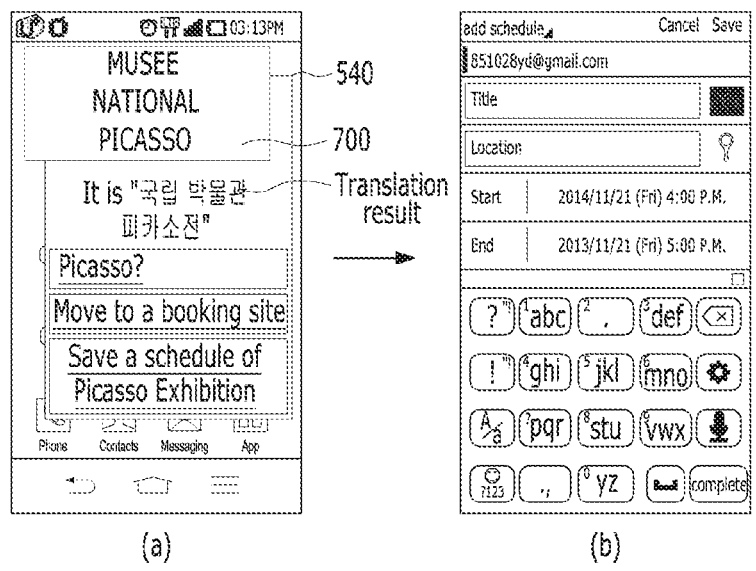
FIG. 19 is a diagram to describe another example of outputting a translation result and an additional information and then running an application corresponding to a selected additional information in case of detecting a touch input of selecting the additional information in a mobile terminal according to one embodiment of the present invention.

FIG. 19 is a diagram to describe another example of outputting a translation result and an additional information and then running an application corresponding to a selected additional information in case of detecting a touch input of selecting the additional information in a mobile terminal according to one embodiment of the present invention. Regarding FIG. 19, the contents redundant with the former description with reference to one of FIG. 8, FIGS. 10 to 12, FIG. 15 and FIG. 18 shall not be described again but the following description shall be made centering on the differences from the former description with reference to one of FIG. 8, FIGS. 10 to 12, FIG. 15 and FIG. 18.

First of all, referring now to FIG. 8(*b*), the controller displays the running screen 540 of the widget corresponding to the translation application on the home screen and is then able to detect the touch input of selecting the icon 601 corresponding to the camera activating function from the icons 600 corresponding to the prescribed functions of the translation application included in the displayed running screen 540.

Referring to FIG. 19(*a*), if the controller 180 detects a touch input to the icon 601, the controller 180 activates the camera 121 and is then able to display a preview image 700 obtained by the activated camera 121 on a partial region of the home screen. Moreover, the controller 180 recognizes a text in the preview image 700 and is then able to display a translation result of the text on a partial region of the home screen. For instance, the controller 180 can display the preview image 700 and the translation result on the running screen 540 of the widget corresponding to the translation application.

If a preset text is included in the translation result, the controller 180 can search for information related to the text using a web browser. Subsequently, the controller 180 extracts additional information using a search result of the web browser and is then able to display the extracted additional information on the running screen 540 together with the translation result. In this case, the additional information may mean the information related to the translation result. Yet, if a length of a content of the additional information is equal to or greater than a preset length, a summarized content of the additional information may be displayed. For instance, if a pretext (e.g., exhibition) is included in the translation result, the controller 180 can extract the additional information by searching for at least one of an exhibition period of works exhibited on the corresponding museum, an address of the corresponding museum, an address of a webpage related to the corresponding museum, an entrance fee of the corresponding museum, and a description of the translation result.

The controller 180 summarizes the content of the extracted additional information and is then able to output the summarized content to the running screen 540. An algorithm for summarizing the content of the extracted additional information may be saved in the memory 170 in advance.

According to an embodiment, referring to FIG. 19, the controller 180 can detect a touch input of selecting a portion of the outputted additional information shown in FIG. 19(*a*). if the touch input is detected, the controller 180 can run an application corresponding to the outputted additional information. For instance, when the translation result includes pretext (e.g., exhibition), if the controller 180 detects a touch input of touching the additional information corresponding to the exhibition period of the works exhibited in the corresponding museum, the controller 180 can run a schedule management application corresponding to the additional information. And, the controller 180 is able to add a schedule of the exhibition period to the schedule management application. If such a text as 'period', 'schedule' or the like is included in the translation result or the additional information, the controller 180 can detect that an application interworkable with the text is a schedule management application.

An algorithm for adding a schedule to a schedule management application based on a schedule written in the additional information may be saved in the memory 170 in advance.

Figure 20:
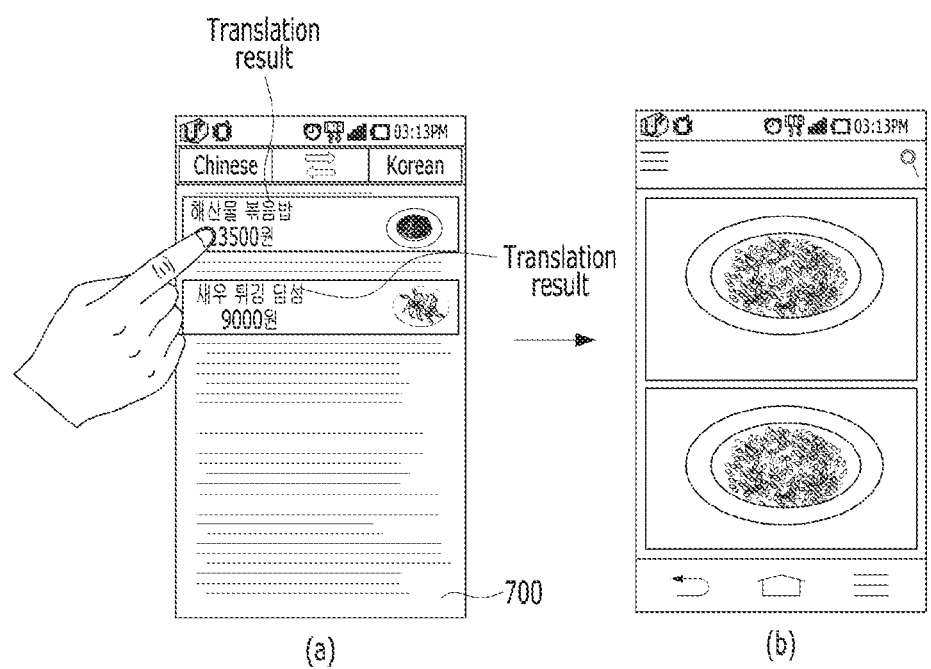
FIG. 20 is a diagram to describe another example of outputting a translation result and an additional information and then running an application corresponding to a selected additional information in case of detecting a touch input of selecting the additional information in a mobile terminal according to one embodiment of the present invention.

FIG. 20 is a diagram to describe another example of outputting a translation result and an additional information and then running an application corresponding to a selected additional information in case of detecting a touch input of selecting the additional information in a mobile terminal according to one embodiment of the present invention.

Regarding FIG. 20, the contents redundant with the former description with reference to one of FIGS. 10 to 12, FIG. 15, FIG. 18 and FIG. 19 shall not be described again but the following description shall be made centering on the differences from the former description with reference to one of FIGS. 10 to 12, FIG. 15, FIG. 18 and FIG. 19.

Referring to FIG. 20(a), if a preset text is included in a translation result of a recognized text, the controller 180 can display an additional information related to the preset text together with the translation result. For instance, if a text related to such a food as 'seafood fried rice', 'fried shrimp dim sum' or the like is included in the translation result within a preview image 700, the controller 180 can search for the text using a web browser. Since the texts related to the food are included in the translation result, the controller 180 can extract additional information by searching for at least one of image, price and preference information on the translation result (e.g., seafood fried rice, fried shrimp dim sum). And, the controller 180 is able to display the extracted additional information together with the translation result.

Referring to FIG. 20(b), if the controller 180 detects a touch input of selecting one of the additional information or a touch input of selecting the translation result, the controller 180 can run an application corresponding to the selected additional information. For instance, if the controller 180 detects a touch input of selecting a text corresponding to the translation result (e.g., seafood fried rice) that is the part corresponding to the search result from the translation result, the controller 180 runs a web browser and is then able to access an internet address from which the additional information corresponding to the selected part was obtained.

Figure 21:
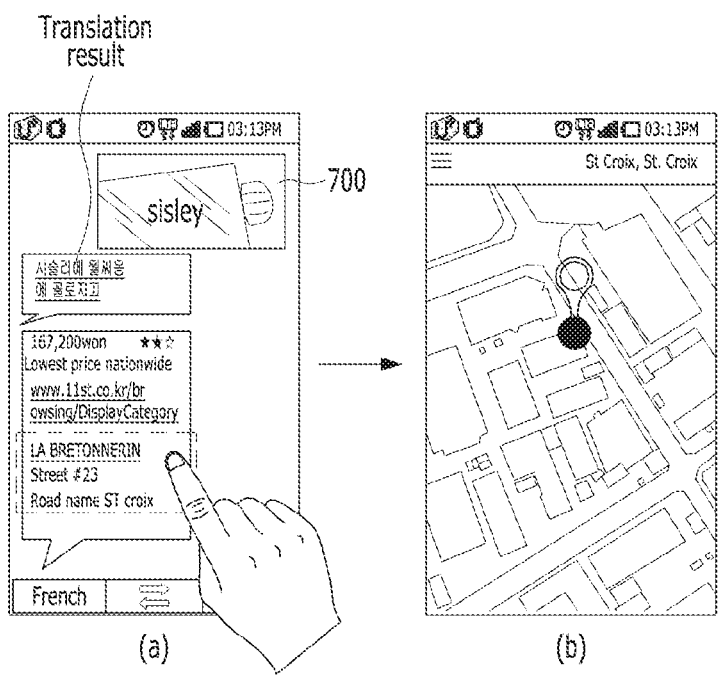
FIG. 21 is a diagram to describe another example of outputting a translation result and an additional information and then running an application corresponding to a selected additional information in case of detecting a touch input of selecting the additional information in a mobile terminal according to one embodiment of the present invention.

FIG. 21 is a diagram to describe another example of outputting a translation result and an additional information and then running an application corresponding to a selected additional information in case of detecting a touch input of selecting the additional information in a mobile terminal according to one embodiment of the present invention. Regarding FIG. 21, the contents redundant with the former description with reference to one of FIG. 5, FIGS. 10 to 12, FIG. 15, FIG. 18, FIG. 19, and FIG. 20 shall not be described again but the following description shall be made centering on the differences from the former description with reference to one of FIG. 5, FIGS. 10 to 12, FIG. 15, FIG. 18, FIG. 19 and FIG. 20.

According to the present embodiment, the controller 180 recognizes a text included in a preview image 700 of a translation application and is then able to translate the recognized text. And, the controller 180 is able to search for an additional information having a preset text included in a translation result of the text through a web browser. For instance, if at least one of a product name, a brand name, and a trademark, which are preset texts, is included in the translation result, the controller 180 can search for an additional information (e.g., a sales address, a price, etc.) related to the translation result through the web browser. Subsequently, the controller 180 extracts the additional information using the search result and is then able to output the additional information together with the translation result.

Referring to FIG. 21(a), since a product name is included in the translation result, the controller 180 can search information on the product name through a web browser. And, the controller 180 is able to extract one of a lowest price of the corresponding product, an internet address from which the lowest price of the corresponding product is found, and a place for purchasing the corresponding product as additional information from the searched information. And, the controller 180 is able to display the extracted additional information together with the translation result.

Referring to FIG. 21(b), if the controller 180 detects a touch input of selecting information related to a location information from the outputted additional information, the controller 180 can run a map application. For instance, if the controller 180 detects a touch input to a text including the information on the place for purchasing the product related to the product name in the outputted additional information, the controller 180 can run the map application. The controller 180 searches the map application for the place using the information on the place and is then able to output a search result to the display unit 151.

Figure 22:
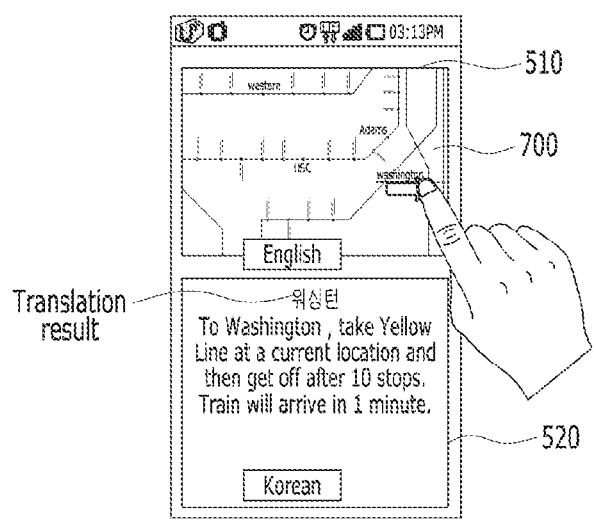
FIG. 22 is a diagram to describe one example of outputting an additional information and a translation result in a mobile terminal according to one embodiment of the present invention.

FIG. 22 is a diagram to describe one example of outputting an additional information and a translation result in a mobile terminal according to one embodiment of the present invention. Regarding FIG. 22, the contents redundant with the former description with reference to one of FIG. 5, FIG. 6, FIGS. 10 to 12, FIG. 15, and FIGS. 18 to 21 shall not be described again but the following description shall be made centering on the differences from the former description with reference to one of FIG. 5, FIG. 6, FIGS. 10 to 12, FIG. 15, and FIGS. 18 to 21.

Referring to FIG. 22, if the controller 180 detects a touch input performed in a manner of applying a touch to a point on an obtained preview image 700 in a first region 510 and then applying a drag to another point, the controller 180 can recognize a text included in a region from which the touch input is detected. Subsequently, the controller 180 is able to output a translation result of the recognized text to a second region 520.

If such a content of a specific location as a station name, a district name or the like is included in the translation result, the controller 180 searches for a method of going to the specific location and is then able to output the found method as an additional information to the second region 520. For instance, if a station name (e.g., 'Washington') is included in the translation result, the controller 180 can activate the position location module 115. Subsequently, the controller 180 is able to obtain a coordinate information corresponding to a current location of the mobile terminal 100 through the activated position location module 115. Using the obtained coordinate information, the controller 180 is able to check a current location of the mobile. The controller 180 searches a method of going to the station from the checked location using the checked location and the station name through a web browser and is then able to output the translation result and the search result to the second region 520.

Figure 23:
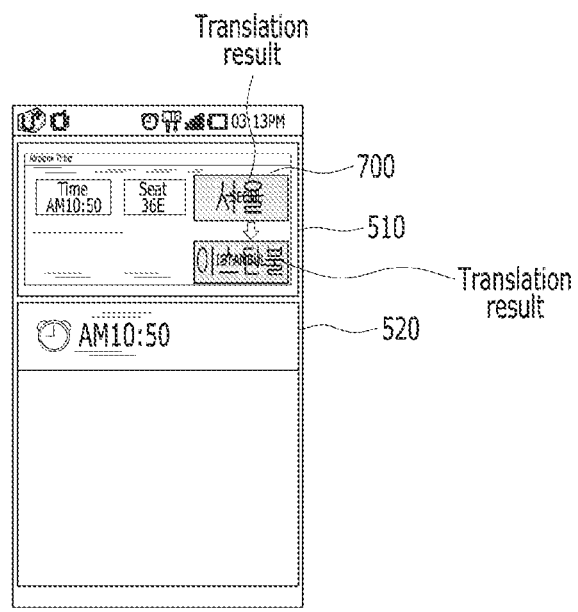
FIG. 23 is a diagram to describe one example of a method of if a preset text is included in a translation result, running a specific application in a mobile terminal according to one embodiment of the present invention.

FIG. 23 is a diagram to describe one example of a method of if a preset text is included in a translation result, running a specific application in a mobile terminal according to one embodiment of the present invention. Regarding FIG. 23, the contents redundant with the former description with reference to one of FIG. 5, FIGS. 10 to 12, FIG. 15 and FIG. 18 shall not be described but the following description shall be made centering on the differences from the former description with reference to one of FIG. 5, FIGS. 10 to 12, FIG. 15 and FIG. 18.

Referring to FIG. 23, the controller 180 is able to output a translation result to a preview image 700 of 1 first region 510. According to an embodiment, if a time corresponding to a preset text is included in the translation result, the controller 180 can output a running screen of an alarm application to a second region 520. For instance, if a text 'AM 10:50' is included in the translation result, the controller 180 output a running screen of an alarm application to the second region 520 and is able to set an alarm time equal to the translation result in the running screen of the alarm application. If the set alarm time arrives, the controller 180 can provide an alarm to a user.

Figure 24:
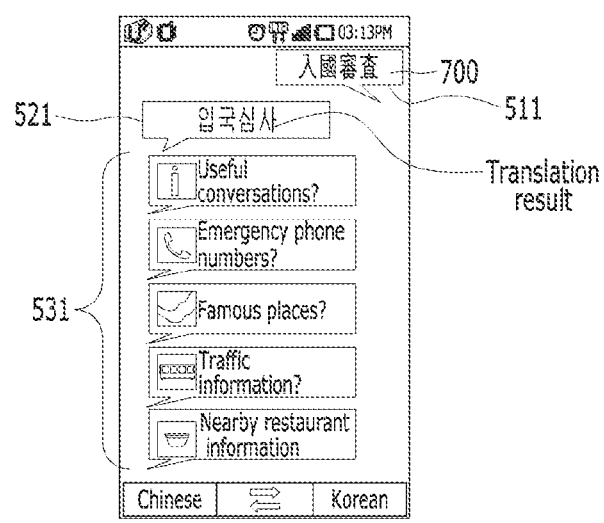
FIG. 24 is a diagram to describe another example of outputting a translation result and an additional information and then running an application corresponding to a selected additional information in case of detecting a touch input of selecting the additional information in a mobile terminal according to one embodiment of the present invention.

FIG. 24 is a diagram to describe another example of outputting a translation result and an additional information and then running an application corresponding to a selected additional information in case of detecting a touch input of selecting the additional information in a mobile terminal according to one embodiment of the present invention. Regarding FIG. 24, the contents redundant with the former description with reference to one of FIG. 5, FIGS. 10 to 12, FIG. 15, and FIGS. 18 to 23 shall not be described but the following description shall be made centering on the differences from the former description with reference to one of FIG. 5, FIGS. 10 to 12, FIG. 15, and FIGS. 18 to 23.

Referring to FIG. 24, while a translation application is running, if the camera 121 is activated, the controller 180 can output a preview image 700 obtained by the camera 121 to a first conversational bubble 511. Subsequently, the controller 180 recognizes a text within the preview image 700 and is then able to translate the recognized text.

According to an embodiment, after the controller 180 has translated the recognized text, the controller 180 activates the position location module 115 and is then able to obtain a coordinate information. The controller 180 can check a current location of the mobile, using the obtained coordinate information and is then able to search information related to the checked location through a web browser. And, the controller 180 is able to display information, which is related to the translation result in the searched information, as an additional information of the translation result. For instance, the controller 180 recognizes a text in the preview image 700 and is then able to translate the recognized text into 'immigration'. Subsequently, the controller 180 activates the position location module and is then able to confirm that a current location of the mobile terminal 100 is an airport. The controller 180 searches information related to the airport through a web browser and is then able to search the web browser for at least one of a useful conversation, an emergency call number, a famous concert, a traffic information, and a nearby restaurant information, which are the additional information related to 'immigration' corresponding to the translation result in the searched information.

The controller 180 outputs the translation result to a second conversational bubble 521 and is also able to output the found additional information to a third conversational bubble 531. Yet, in case that a plurality of additional information exist, the controller 180 creates a plurality of the third conversational bubbles 531 and is then able to output a plurality of the additional information to a plurality of the third conversational bubbles 531, respectively.

Meanwhile, if a preset text is included in a translation result without activation of the position location module 115, the controller 180 may be able to display information related to the text together with the translation result. For instance, if a preset text 'immigration' is included in a translation result, the controller 180 can display at least one of a useful conversation, an emergency call number, a famous concert, a traffic information, and a nearby restaurant information, which are the additional information related to the preset text, together with the translation result. The controller 180 outputs the translation result to a second conversational bubble 521 and is also able to output the additional information to a third conversational bubble 531. Yet, in case that a plurality of additional information exist, the controller 180 creates a plurality of the third conversational bubbles 531 and is then able to output a plurality of the additional information to a plurality of the third conversational bubbles 531, respectively.

Figure 25:
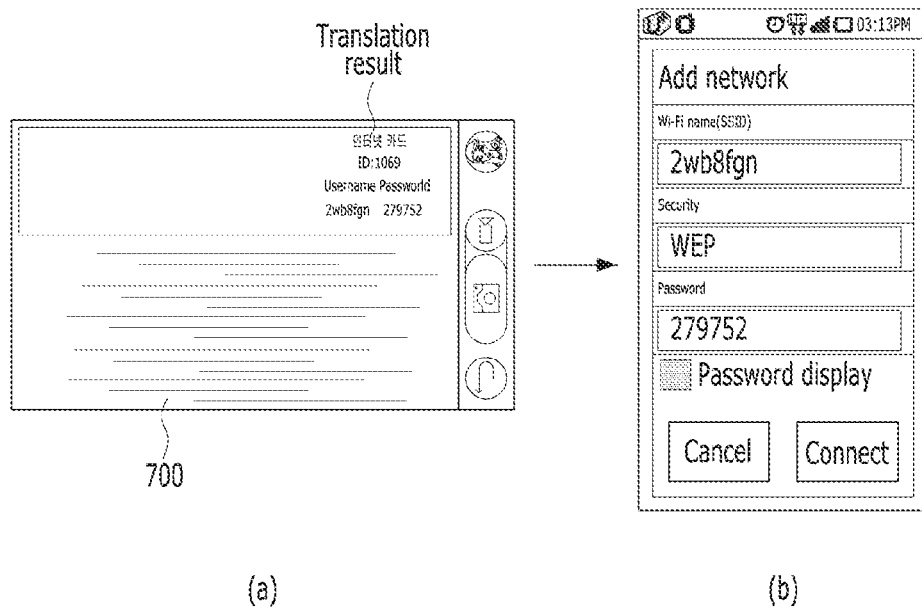
FIG. 25 is a diagram to describe another example of a method of if a preset text is included in a translation result, running a specific application in a mobile terminal according to one embodiment of the present invention.

FIG. 25 is a diagram to describe another example of a method of if a preset text is included in a translation result, running a specific application in a mobile terminal according to one embodiment of the present invention. Regarding FIG. 25, the contents redundant with the former description with reference to one of FIGS. 10 to 12, FIG. 15 and FIG. 18 shall not be described but the following description shall be made centering on the differences from the former description with reference to one of FIGS. 10 to 12, FIG. 15 and FIG. 18.

Referring to FIG. 25(a), if the controller 180 detects a first command for entering a translation mode in a camera application, the controller 180 can enable the translation mode. If the translation mode is enabled, the controller 180 can display a GUI window, which is provided to select a partial region, on a preview image 700 obtained by the camera 121. The controller 180 detects a second command for shifting the GUI window and is then able to shift the GUI window in response to the second command. Subsequently, the controller 180 recognizes a text included in a part corresponding to the location shifted GUI window and is then able to translate the recognized text. Moreover, if a preset text is included in a result of the translation, the controller 180 can display a running screen of an application corresponding to the preset text among specific applications interworking with the translation mode together with the translation result.

Yet, referring to FIG. 25(b), if a wireless internet related text (e.g., a name of a wireless internet sharer, an access password, etc.), which is a preset text, is included in a translation result of a text included in a part corresponding to the GUI window 710, the controller 180 may display a running screen of a wireless internet configuration application that is an application corresponding to the preset text.

If the wireless internet configuration application is run, the controller 180 can automatically execute a wireless internet connection using the recognized text.

An algorithm for automatically executing a wireless internet connection using the recognized text may be saved in the memory 170 in advance.

Figure 26:
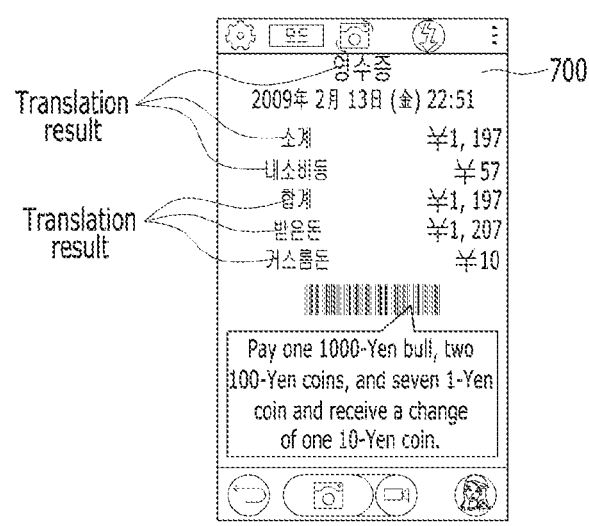
FIG. 26 is a diagram to describe another example of outputting an additional information and a translation result in a mobile terminal according to one embodiment of the present invention.

FIG. 26 is a diagram to describe another example of outputting an additional information and a translation result in a mobile terminal according to one embodiment of the present invention. Regarding FIG. 26, the contents redundant with the former description with reference to one of FIG. 5, FIG. 6, FIGS. 10 to 12, FIG. 15 and FIG. 18 shall not be described but the following description shall be made centering on the differences from the former description with reference to one of FIG. 5, FIG. 6, FIGS. 10 to 12, FIG. 15 and FIG. 18.

According to the present embodiment, if the controller 180 detects a first command for entering a translation mode in a camera application, the controller 180 can enable the translation mode. The controller 180 recognizes a text in a preview image 700 by the translation mode and is then able to translate the recognized text. Subsequently, the controller 180 can display a result of the translation on the preview image 700.

Referring to FIG. 26, if a preset text is included in the translation result, the controller 180 can display additional information related to the text. For instance, if the preset text 'receipt' is included in the translation result, the controller 180 can display such additional information as a method of paying a money, a change amount and the like together with the translation result based on numerals in the recognized text.

An algorithm for outputting additional information such as an owed money paying method, a change amount and the like based on numerals of the recognized text may be saved in the memory 170 in advance.

Figure 27:
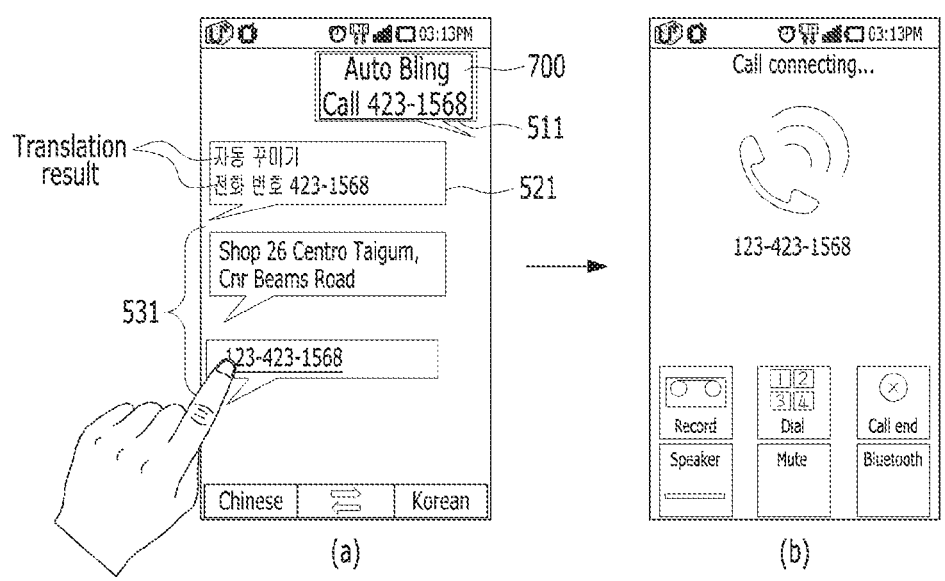
FIG. 27 is a diagram to describe another example of outputting a translation result and an additional information and then running an application corresponding to a selected additional information in case of detecting a touch input of selecting the additional information in a mobile terminal according to one embodiment of the present invention.

FIG. 27 is a diagram to describe another example of outputting a translation result and an additional information and then running an application corresponding to a selected additional information in case of detecting a touch input of selecting the additional information in a mobile terminal according to one embodiment of the present invention. Regarding FIG. 27, the contents redundant with the former description with reference to one of FIG. 5, FIGS. 10 to 12, FIG. 15 and FIG. 18 shall not be described but the following description shall be made centering on the differences from the former description with reference to one of FIG. 5, FIGS. 10 to 12, FIG. 15 and FIG. 18.

Referring to FIG. 27(*a*), if a preview image 700 obtained by the camera 121 is outputted to a first conversational bubble 511, the controller 180 recognizes a text in the obtained preview image and is then able to output a translation result of the recognized text to a second conversational bubble 521.

If a preset text is included in the translation result, the controller 180 can output additional information related to the preset text to a third conversational bubble 531. Yet, if a plurality of the additional information exist, the controller 180 creates a plurality of the third conversational bubbles 531 and is then able to output a plurality of the additional information to a plurality of the third conversational bubbles 531, respectively. For instance, if a preset text 'phone number' is included in the translation result, the controller 180 can output allocation information and a phone number having an area code added thereto, which are the additional information related to the preset text, to the third conversational bubbles 531, respectively.

Referring to FIG. 27(*b*), if the controller 180 detects a touch input of selecting the area code added phone number shown in FIG. 27(*a*), the controller 180 can run a corresponding phone application.

According to an embodiment, the controller 180 may send a call signal using the area code added phone number or save the area code added phone number to contacts.

Figure 28:
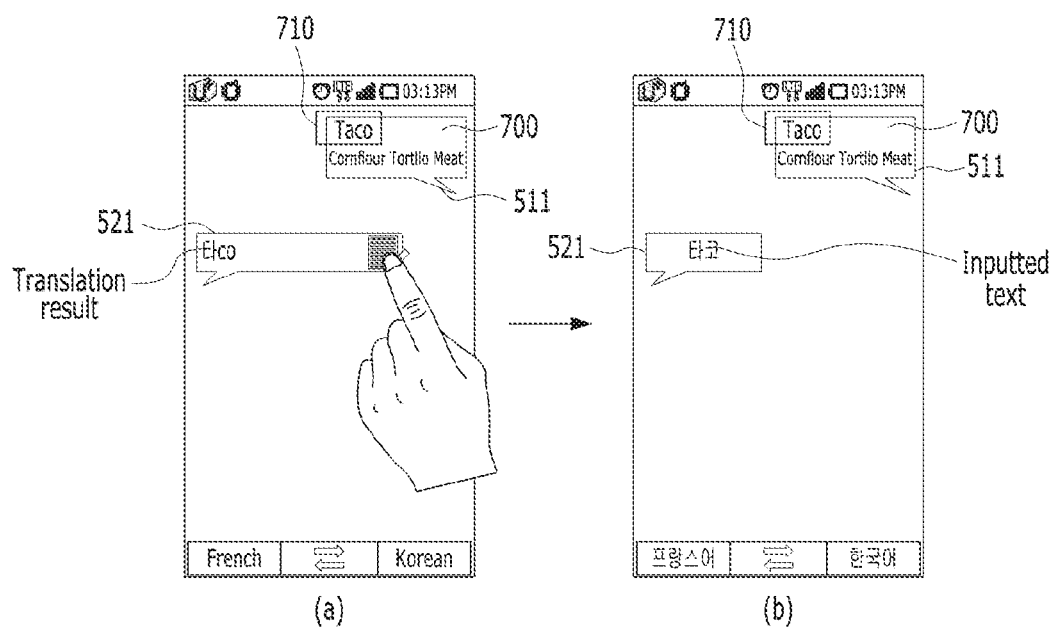
FIG. 28 is a diagram to describe a method of revising a translation result in a mobile terminal according to one embodiment of the present invention.

FIG. 28 is a diagram to describe a method of revising a translation result in a mobile terminal according to one embodiment of the present invention. Regarding FIG. 28, the contents redundant with the former description with reference to one of FIG. 5, FIGS. 10 to 12, FIG. 15 and FIG. 20 shall not be described but the following description shall be made centering on the differences from the former description with reference to one of FIG. 5, FIGS. 10 to 12, FIG. 15 and FIG. 20.

Referring to FIG. 28(*a*), the controller 180 can receive an input of a preview image 700, which is obtained by the camera 121, to a first conversation bubble 511. If the preview image 700 is inputted, the controller 180 may display a GUI window 710 for selecting a partial region from the preview image 700. The controller 180 recognizes a text of a region in which the GUI window 710 is located and is then able to output a translation result of the recognized text to a second conversational bubble 521.

Meanwhile, according to an embodiment, if the controller 180 detects a command for revising at least one portion of the translation result outputted to the second conversational bubble 521, the controller 180 may be able to revise the translation result. In this case, the 'revise' means to substitute at least one portion of the translation result with a text inputted by a user. For instance, if the controller 180 detects a touch input of selecting a specific icon for revision from the second conversational bubble 521, the controller 180 may receive an input of a text in accordance with the touch input.

Referring to FIG. 28(*b*), the controller 180 substitutes at least one portion of the translation result with the inputted text and is then able to output it to the second conversational bubble 521. The controller 180 maps the text included in the GUI window 710 within the first conversational bubble 511 and the inputted text to each other and is then able to save the mapped texts in the memory 170. In particular, the controller 180 maps the translation result of the text 'Taco' included in the GUI window 710 to the inputted text and is then able to save it in the memory 170.

According to the above-described embodiment, a translation result is revised and the revised result is saved in the memory 170 by being mapped to a recognized text, whereby translation completion can be improved.

Figure 29:
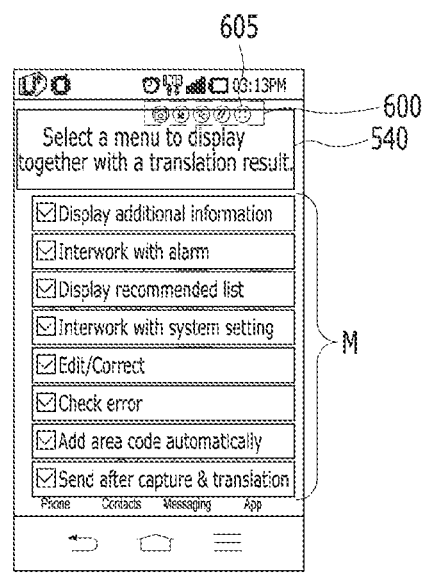
FIG. 29 is a diagram to describe a method of if a preset text is included in a translation result, setting an application to run or an additional information to display in a mobile terminal according to one embodiment of the present invention.

FIG. 29 is a diagram to describe a method of if a preset text is included in a translation result, setting an application to run or an additional information to display in a mobile terminal according to one embodiment of the present invention. Regarding FIG. 29, the contents redundant with the former description with reference to one of FIG. 7 and FIGS. 18 to 27 shall not be described but the following description shall be made centering on the differences from the former description with reference to one of FIG. 7 and FIGS. 18 to 27.

Referring to FIG. 29, when a touch input of selecting an icon 605 for outputting a setting menu of a translation application from icons 600 corresponding to prescribed functions of the translation application is detected from a running screen 540 of a widget corresponding to the translation application, the controller 180 can output a menu (M) for selecting additional information, which is to be displayed if a preset text is included in a translation result, or an application to run. For instance, the menu (M) can include a menu corresponding to a function of displaying additional information related to the translation result, a menu corresponding to a function of running an alarm application corresponding to the translation result, a menu corresponding to a function of adding an area code to a phone number automatically in case of a presence of the phone number included in the translation result, and the like.

According to an embodiment, if a prescribed menu is selected from the menu (M), the controller 180 can determine whether to display the additional information related to the selected menu in the menu (M) in case of a presence of a preset text included in the translation result or whether to run an application related to the selected menu. For instance, assume that the additional information display function is selected from the meu (M). And, assume that the automatic area code adding function is not selected. If a preset text 'phone number' is included in the translation result, the controller 180 displays the translation result and the additional information related to the translation result but may not display an area code related to the phone number in the additional information.

Meanwhile, if any menu is not selected from the menu (M), the controller 180 outputs the translation result only. Although a preset text is included in the translation result, the controller 180 may not display the additional information related to the text and may not run the application related to the text.

According to the above-described embodiment, if a preset text is included in a translation result, unnecessary additional information or a running screen of an unnecessary specific application can be prevented from being displayed together with the translation result.

Figure 30:
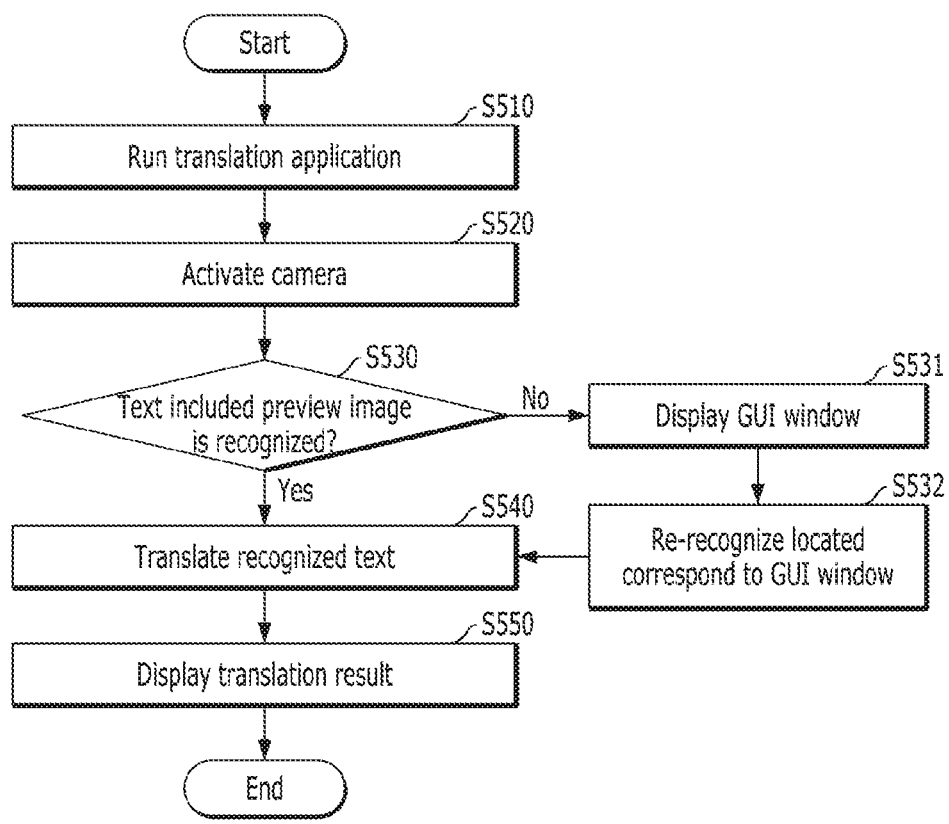
FIG. 30 is a flowchart to describe one example of a method of doing a translation by running a translation application in a mobile terminal 100 according to one embodiment of the present invention.

FIG. 30 is a flowchart to describe one example of a method of doing a translation by running a translation application in a mobile terminal 100 according to one embodiment of the present invention.

Referring to FIG. 30, the controller 180 of the mobile terminal 100 can run a translation application in response to a command for running the translation application previously saved in the memory 170 [S510]. In case of running the translation application, the controller 180 can use a template selected automatically or by a user from a plurality of templates saved in the memory 170. This is identical to the former description with reference to FIG. 5 and its details shall be omitted from the following description.

According to an embodiment, in case of detecting a touch input of dragging a specific icon on a lock screen in a specific direction or a touch input of selecting a specific icon created to cope with a translation required situation, the controller 180 may run a translation application. This is identical to the former description with reference to FIG. 6 and its details shall be omitted from the following description.

The camera 121 can be activated if the translation application is run [S520]. If the camera 121 is activated, the controller 180 can control the display unit 151 to display a preview image obtained by the camera 121.

According to an embodiment, instead of activating the camera 121 in the step S520, the controller 180 may obtain a voice by activating the microphone 122, receive an input of a text, or load an image previously saved in the memory 170.

In case of obtaining the voice by activating the microphone 122, the controller 180 analyzes the voice and is then able to covert a content of the voice to a text. Subsequently, the controller 180 translates the converted text and is then able to display a result of the translation in a step S550.

The controller 180 can detect a text inputted through the display unit 151. For instance, the controller 180 may detect a text corresponding to a user's touch input or a text inputted through a keyboard displayed on the display unit 151. In this case, the user's touch input may include a touch input of drawing a specific pattern in a manner of applying a touch to a point of the display unit 151 and then applying a drag to another point continuously. If a text is detected, the controller 180 translates the detected text and is then able to display a result of the translation in the step S550.

The controller 180 can recognize a text included in the preview image [S530]. In this case, the preview image may include an image loaded from the memory 170. For clarity of the following description with reference to FIG. 30, the preview image is regarded as including the image loaded from the memory 170.

According to an embodiment, if the controller 180 recognizes the text included in the preview image, the controller 180 may display a GUI window for selecting a partial region. If the GUI window is displayed, the controller 180 may change a location and form of the GUI window or may copy the GUI window. And, the controller 180 can recognize a text included in the GUI window. This is identical to the former description with reference to one of FIGS. 10 to 12 and FIG. 15 and its details shall be omitted from the following description.

If at least one portion of the text included in the preview image is not recognized, the controller 180 can control the display unit 151 to display a GUI window for selecting at least one partial region from the running screen of the translation application [S531].

In some cases, if the controller 180 fails in recognizing a partial region of the text, the controller 180 detects a second command for selecting a partial region from the text, detects a third command for inputting a prescribed pattern to a screen of the display unit 151, and is then able to recognize a text corresponding to the partial region selected by the second command by substituting the text corresponding to the partial region selected by the second command with the pattern inputted by the third command. This is identical to the former description with reference to FIG. 17 and its details shall be omitted from the following description.

According to an embodiment, the controller 180 can control the GUI window to be located to correspond to an unrecognized part of the text. Moreover, the controller 180 may change a location and form of the GUI window or may copy the GUI window. Subsequently, the controller 180 can re-recognize a text located to correspond to the GUI window [S532]. This is identical to the former description with reference to one of FIGS. 10 to 12 and FIG. 15 and its details shall be omitted from the following description.

According to an embodiment, in case of re-recognizing the text located to correspond to the GUI window, the controller 180 can re-recognize the text by enlarging a region corresponding to the GUI window at a preset ratio. This is identical to the former description with reference to FIG. 16 and its details shall be omitted from the following description.

If the controller 180 recognizes the text included in the preview image or the text located to correspond to the GUI window (case of re-recognition included), the controller 180 can translate the recognized text into a preset language [S540].

An algorithm for translating the recognized text may be saved in the memory 170 in advance.

The controller 180 can display a result of the translation on the display unit 151 [S550]. According to an embodiment, the controller 180 can control the translation result to be displayed in a manner of overlapping the recognized text or can display the translation result on a partial region of the display unit 151.

According to an embodiment, the controller 180 may share the preview image 700 obtained by the camera 121 and the translation result with an external device. If a command for sharing the translation result with an external device is detected, the wireless communication unit 110 searches for external devices capable of wireless communication, connects a wireless communication with the external device selected by a user from the found external devices, and is then able to transmit the obtained preview image 700 and the translation result to the wireless communication connected external device, under the control of the controller 180. According to the present embodiment, the wireless communication unit 110 may include at least one of a short range communication module, a wireless internet module and a mobile communication module.

Figure 31:
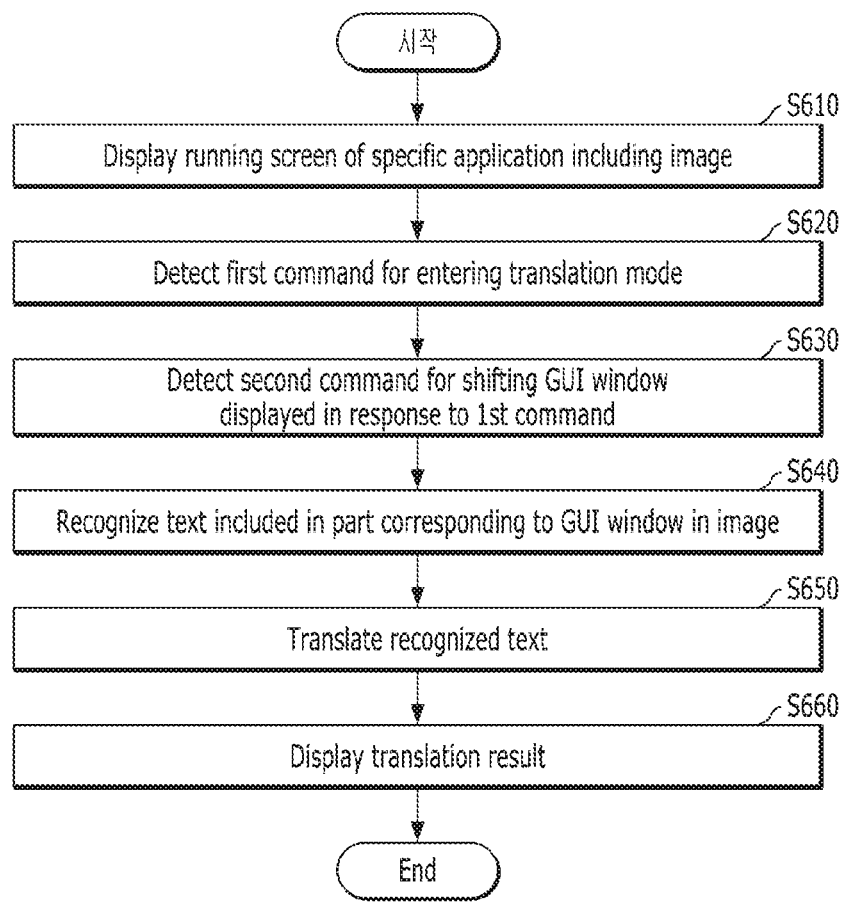
FIG. 31 is a flowchart to describe one example of a method of doing a translation by entering a translation mode of a specific application including an image in a mobile terminal 100 according to one embodiment of the present invention.

FIG. 31 is a flowchart to describe one example of a method of doing a translation by entering a translation mode of a specific application including an image in a mobile terminal 100 according to one embodiment of the present invention.

Referring to FIG. 31, the controller 180 can display a running screen of a specific application [S610]. In some cases, the running screen may be configured with an image. For instance, the running screen may include one of a running screen of a web browser, a running screen of a camera application, a running screen of a translation application, and a loaded image previously saved in the memory 170.

The controller 180 can detect a first command for entering a translation mode [S620]. For instance, the first command may include a touch input performed in a manner of applying a touch to a point of a preview image of a camera application and then applying a drag to another point. Alternatively, the first command may include a touch input of selecting a command for entering a translation mode from a setting menu.

According to an embodiment, if the controller 180 detects the first command, the controller 180 may display a GUI window, which is provided to select at least one partial region of the running screen, on the running screen.

According to an embodiment, if the controller detects the first command, the controller 180 can change a form of the GUI window by detecting a third command for changing the form of the GUI window. This is identical to the former description with reference to FIG. 12 and its details shall be omitted from the following description.

According to an embodiment, if the controller detects the first command, the controller 180 detects a fourth command for copying the GUI window for selecting a plurality of regions, creates a plurality of the GUI windows in response to the fourth command, and is then able to output the created GUI windows to the running screen. This is identical to the former description with reference to FIG. 11 and its details shall be omitted from the following description.

Yet, instead of displaying the GUI window on the running screen, the controller 180 recognizes a text in an image included in the running screen, translates the recognized text, and is then able to display a result of the translation.

If the GUI window is displayed, the controller 180 can detect a second command for shifting the GUI window onto an image included in the running screen [S630]. This is identical to the former description with reference to one of FIG. 10, FIG. 13 and FIG. 14 and its details shall be omitted from the following description.

According to an embodiment, the second command may include a touch input performed in a manner of applying a touch to a point within the image included in the running screen and then applying a drag to another point. In response to the touch input, the controller 180 can control the GUI window to be displayed on the image included in the running screen in a manner of corresponding to a region from which the touch input is detected. This is identical to the former description with reference to FIG. 15 and its details shall be omitted from the following description.

The controller 180 can recognize a text included in a part corresponding to the GUI window within the image in response to the second command [S640].

According to an embodiment, in case that the text is recognized, an image of the part corresponding to the GUI window is enlarged and a text included in the enlarged part of the image of the corresponding part can be then recognized. This is identical to the former description with reference to FIG. 16 and its details shall be omitted from the following description.

In a step S650, the controller 180 translates the recognized text. And, the controller 180 can control the display unit 151 to display a result of the translation [S660]. According to an embodiment, the translation result may be displayed in a manner of overlapping the recognized text. Alternatively, the translation result may be displayed on a partial region of the display unit 151.

According to an embodiment, if a preset text is included in the translation result, the controller 180 may display additional information related to the preset text together with the translation result. In some cases, if the controller 180 detects a touch input of touching the additional information, the controller 180 may run an application corresponding to the additional information among specific applications interworking with a translation mode. Alternatively, if a preset text is included in the translation result, the controller 180 may display a running screen of an application corresponding to the preset text among specific applications interworking with a translation mode together with the translation result. This is identical to the former description with reference to one of FIGS. 18 to 28 its details shall be omitted from the following description.

According to an embodiment, if a preset text is included in the translation result, the controller 180 may select an additional information to display or an application to run. This is identical to the former description with reference to FIG. 29 and its details shall be omitted from the following description.

According to an embodiment, in case of displaying the additional information together with the translation result, the controller 180 may search for the additional information suing a location information. For instance, the position location module 115 may obtain a coordinate information. Using the obtained coordinate information, the controller 180 can check a current location of the mobile. Subsequently, if a preset text is included in the translation result, the controller 180 searches information related to the checked location through a web browser and is then able to display the information related to the translation result in the searched information as additional information of the translation result.

According to an embodiment, the controller 180 can detect a fifth command for revising at least one portion of the translation result. If the controller 180 detects the fifth command, the controller 180 can control a translation result revised in response to the fifth command to be saved in the memory 170 in a manner of being mapped to the recognized text. This is identical to the former description with reference to FIG. 28 and its details shall be omitted from the following description. This is identical to the former description with reference to FIG. 5 and its details shall be omitted from the following description.

According to an embodiment, the controller 180 may share the translation result and the additional information with an external device together with an image included in a specific application. If a command for sharing the translation result with an external device is detected, the wireless communication unit 110 searches for external devices capable of wireless communication, connects a wireless communication with the external device selected by a user from the found external devices, and is then able to transmit the translation result and the additional information to the wireless communication connected external device together with the image included in the specific application, under the control of the controller 180. According to the present embodiment, the wireless communication unit 110 may include at least one of a short range communication module, a wireless internet module and a mobile communication module.

Meanwhile, according to the present invention, when a photo is taken in specific mode of a camera application, an image taken in the specific mode can be displayed on a photo album. If the displayed image is selected from the photo album, the controller 180 displays an indicator, which indicates a translation required part, on the image. If a touch input of selecting the indicator is detected, the controller 180 can translate a text included in the image. This is described in detail with reference to FIG. 32 as follows.

Figure 32:
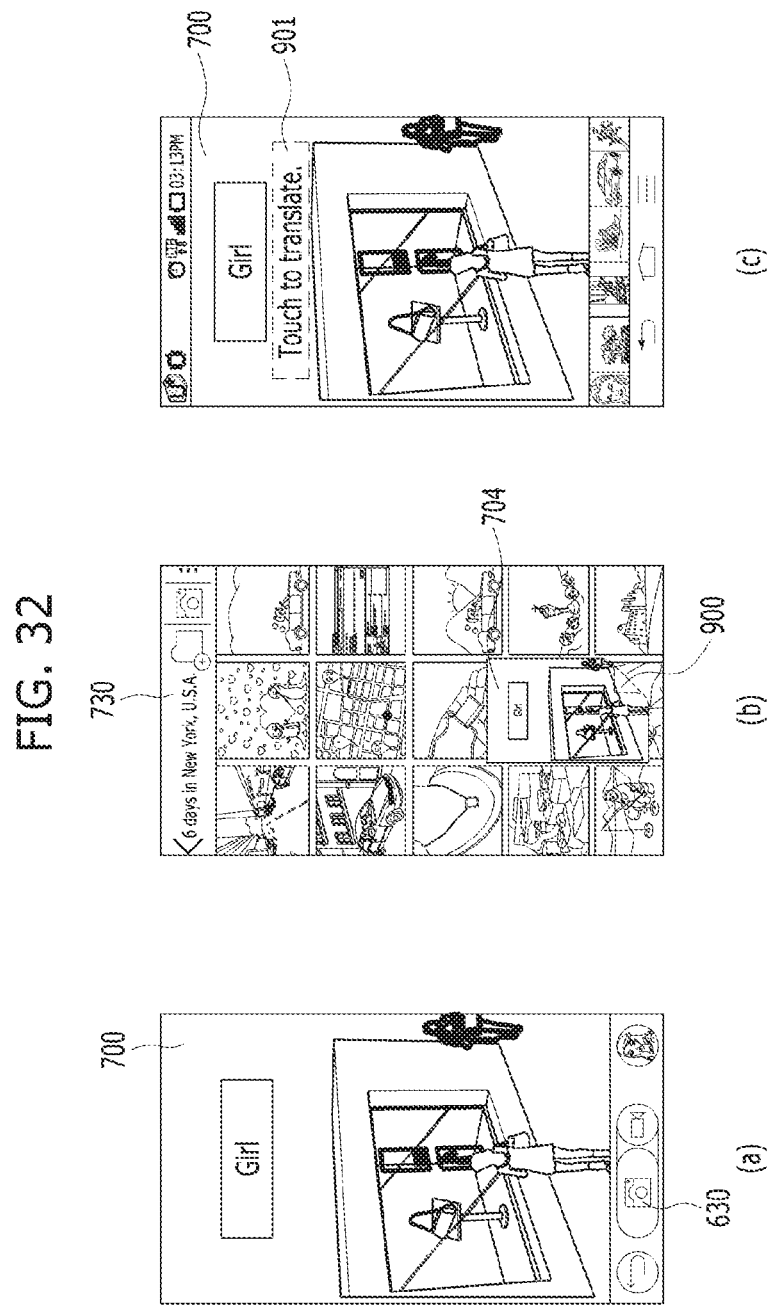
FIG. 32 is a diagram to describe a method of saving an image captured in a specific mode of a camera application in a memory 170 and displaying the image in a mobile terminal according to one embodiment of the present invention.

FIG. 32 is a diagram to describe a method of saving an image captured in a specific mode of a camera application in a memory 170 and displaying the image in a mobile terminal according to one embodiment of the present invention. Regarding FIG. 32, the contents redundant with the former description with reference to one of FIGS. 10 to 12, FIG. 15, and FIGS. 18 to 27 shall not be described again but the following description shall be made centering on the differences from the former description with reference to one of FIGS. 10 to 12, FIG. 15, and FIGS. 18 to 27.

According to the present embodiment, the controller 180 can detect a command for entering a specific mode of a camera application. For instance, the specific mode of the camera application may include a mode as follows. First of all, if a translation required text exists in a captured image, the translation required text is detected. Secondly, a translation result of the corresponding text is saved in the memory 170 together with the captured image. A user is able to select the specific mode from a mode select menu of the camera application.

Referring to FIG. 32(a), if the controller 180 detects a touch input of selecting a photograph icon 630 in specific mode of a camera application, the controller 180 can capture a preview image 700.

If a text is included in the preview image 700 captured in the specific mode, the controller 180 can translate the text included in the captured preview image 700. Subsequently, the controller 180 can save a result of the translation in the memory 170 together with the captured preview image 700.

Yet, if a text is not included in the captured preview image 700, the controller 180 can save the captured preview image 700 in the memory 170.

Meanwhile, referring to FIG. 32(b), on a screen 730 for selecting one of images previously saved in the memory 170, the controller 180 can mark an image 704 captured in the specific mode in order to indicate that the corresponding image was captured in the specific mode. For instance, on the screen 730 for selecting one of images previously saved in the memory 170, the controller 180 can mark a right bottom region 900 within a region, in which the image 704 captured in the specific mode is displayed, to distinguish that the corresponding image is the image 704 captured in the specific mode.

According to an embodiment, the controller 180 extracts only the image 704 captured in the specific mode from the screen 730 for selecting at least one of images previously saved in the memory 170 and is then able to display the extracted image on the screen 730.

Referring to FIG. 32(c), if the controller 180 detects a touch input of selecting the image 704 captured in the specific mode from the screen 730 for selecting one of images previously saved in the memory 170, the controller 180 can display the captured preview image 700. If the controller 180 detects a translation result saved together with the captured preview image 700, the controller 180 can display an indicator 901, which indicates a translation required part within the captured preview image 700, on the captured preview image 700. For instance, using the indicator 901 including such a text as 'Touch to translate', the controller 180 can indicate a translation required text included in the captured preview image 700.

If the controller 180 detects a touch input of selecting the indicator 901, the controller 180 can display the translation result on the captured preview image 700.

According to an embodiment, if a preset text is included in the translation result of the recognized text, the controller 180 can search for information related to the text using a web browser. Subsequently, the controller 180 extracts additional information using a result of the search of the web browser and may be then able to output the extracted additional information together with the translation result. This is identical to the former description with reference to one of FIGS. 18 to 27 and its details shall be omitted from the following description.

Moreover, if a preset text is included in the translation result of the recognized text, the controller 180 may output a running screen of an application related to the text among applications interworking with a specific mode. This is identical to the former description with reference to one of FIGS. 18 to 27 and its details shall be omitted from the following description.

According to an embodiment, the controller 180 may share the image 704 taken in the specific mode and the translation result with an external device. If a command for sharing the translation result with an external device is detected, the wireless communication unit 110 searches for external devices capable of wireless communication, connects a wireless communication with the external device selected by a user from the found external devices, and is then able to transmit the taken image 704 and the translation result to the wireless communication connected external device, under the control of the controller 180. According to the present embodiment, the wireless communication unit 110 may include at least one of a short range communication module, a wireless internet module and a mobile communication module.

According to an embodiment, a user can easily find an image taken in specific mode of a camera application, a translation required text in the image taken in the specific mode can be indicated using an indicator, and a translation result can be displayed by a user's selection, whereby the user can be provided with convenience.

Meanwhile, according to the present invention, if a video is made or a video previously saved in the memory 170 is played, the controller 180 recognizes a translation required part on a running screen of the video and then marks the recognized part with an indicator. If the indicator is selected, a translation can be performed. This is described in detail with reference to FIG. 33 as follows.

Figure 33:
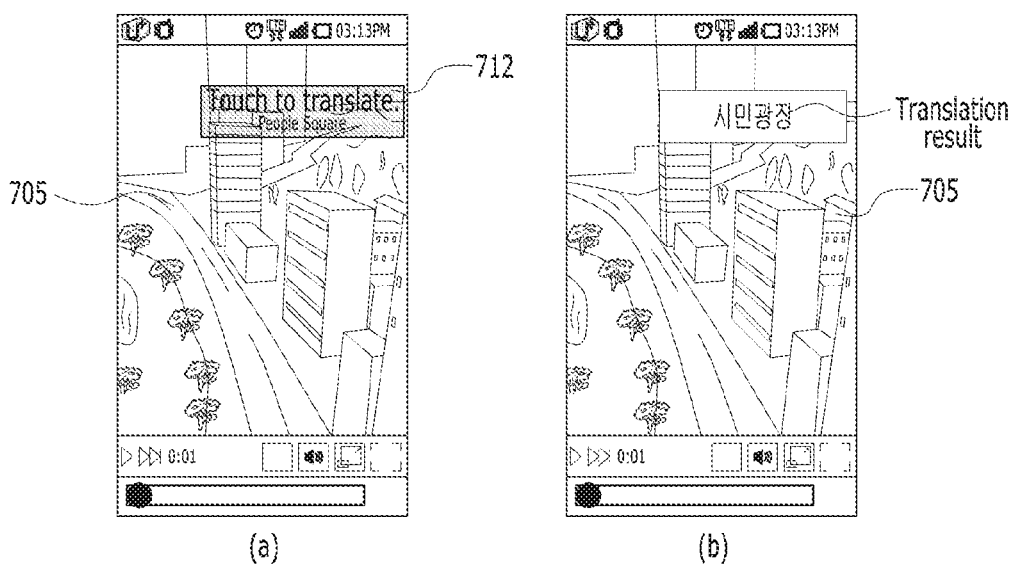
FIG. 33 is a diagram to describe a method of activating a translation in case of making a video or playing a video previously saved in a memory in a mobile terminal according to one embodiment of the present invention.

FIG. 33 is a diagram to describe a method of activating a translation in case of making a video or playing a video previously saved in a memory 170 in a mobile terminal 100 according to one embodiment of the present invention.

Referring to FIG. 33(a), in case of playing a video previously saved in the memory 170, the controller 180 can recognize a translation required part (e.g., a text) on a play screen 705 of the video and is able to display an indicator 712, which indicates the translation required part, on the play screen 705. For instance, when a video previously saved in the memory 170 is played, the controller 180 can recognize a text included in each frame of the video. If the controller 180 recognizes that the recognized text corresponds to a translation required preset language, the controller 180 can display an indicator 712, which includes such a phrase as 'Touch to translate', above the recognized text on the paly screen 705.

Subsequently, referring to FIG. 33(b), the controller 180 translates the recognized text and is then able to display a result of the translation on the video. For instance, the controller 180 can output the translation result with which the recognized text is substituted. An algorithm for substituting the recognized text with the translation result may be saved in the memory 170 in advance. Moreover, the controller 180 may control the translation result to be displayed in a manner of overlapping the recognized text.

Yet, it may happen that a processing speed for the controller 180 to recognize and translate a translation required part on the play screen 705 of the video may not follow a play speed of the video. Hence, if the controller 180 recognizes the translation required part on the play screen 705, the controller 180 may control a play speed of the video previously saved in the memory 170 to be reduced.

Meanwhile, the controller 180 translates a voice outputted in case of playing the video into a preset language and may be then able to output a translation result of the voice together with a translation result of a text included in the play screen 705 of the video.

According to an embodiment, in case of making a video, the controller 180 recognizes a text from a preview screen of the video. If the recognized text needs a translation, the controller 180 may display the indicator 712 on the preview screen of the video.

In some cases, in case of making a video, the controller 180 obtains a coordinate information through the position location module 115 and is then able to check a current location of the mobile using the coordinate information. Subsequently, the controller 180 can recognize the recognized text with a language related to the place. For instance, if the controller 180 confirms that the currently located place of the mobile terminal 100 is Japan, the controller 180 can recognize the recognized text with Japanese.

If the controller 180 detects an input of touching the indicator 712, the controller translates a text on the preview screen of the video and may be then able to display a result of the translation on the preview screen. The controller 180 can save an image, which is in a state that the translation result is displayed on the video, in the memory 170.

According to an embodiment, on a screen for selecting at least one of an image previously saved in the memory 170 and a video previously saved in the memory 170, the controller 180 can mark that the video made in the translation mode is the video made in the translation mode. Moreover, the controller 180 can control the video made in the translation mode to be outputted only from the screen for selecting at least one of an image previously saved in the memory 170 and a video previously saved in the memory 170.

Meanwhile, the controller 180 translates a voice, which is inputted in case of making the video, into a preset language and may be then able to output a translation result of the voice together with a translation result of a text included in the play screen 705 of the video.

According to the present embodiment, it is advantageous in that a text included in a video can be translated.

Accordingly, the present invention provides the following effects and/or features.

First of all, the present invention can raise a recognition rate of a text existing in an image.

Secondly, the present invention provides additional information related to a translation result together with the translation result, thereby raising practicability of a translation application.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The present invention relates to a mobile terminal and a method for controlling the same. Therefore, the present invention has industrial applicability.

The invention claimed is:

1. A mobile terminal comprising:
a camera configured to capture images;
a display unit configured to display information; and
a controller configured to:
control the camera to capture a preview image;
control the display unit to display the captured preview image;
detect a first command for entering a translation mode;
control the display unit in response to the detected first command to display a graphic user interface (GUI) window on the displayed preview image for selecting at least one region of text included in the displayed preview image;
control the display unit to display a translation of selected text on the displayed GUI window if text corresponding to the displayed GUI window is recognized, the translation related to the recognized text;
control the display unit to enlarge a portion of the displayed preview image within the displayed GUI window according to a preset ratio if text corresponding to the displayed GUI window is not recognized;
recognize text included in the enlarged portion of the displayed preview image; and
control the display unit to display a translation on the displayed preview image, the translation of the recognized text included in the enlarged portion on the displayed preview image.

2. The mobile terminal of claim 1, wherein the controller is further configured to:
   detect a second command for changing at least a location or a form of the displayed GUI window; and
   control the display unit to change at least the location or the form of the displayed GUI window in response to the detected second command.

3. The mobile terminal of claim 1, wherein the controller is further configured to:
   detect a second command for copying the displayed GUI window;
   create a plurality of GUI windows in response to the detected second command; and
   control the display unit to display the created plurality of GUI windows.

4. The mobile terminal of claim 1, wherein the controller is further configured to:
   detect a touch input to a first point in the displayed preview image that is dragged to a second point; and
   control the display unit to change a location of the displayed GUI window according to the detected touch input.

5. The mobile terminal of claim 1, wherein the controller is further configured to:
   recognize a portion of text included in the displayed preview image in response to the detected first command;
   control the display unit to display the GUI window to correspond to a portion of unrecognized text;
   recognize at least a portion of the unrecognized text; and
   control the display unit to display a translation of the recognized at least a portion of the unrecognized text.

6. The mobile terminal of claim 1, wherein the controller is further configured to control the display unit to display additional information related to preset text included in the translation together with the displayed translation.

7. A method of controlling a mobile terminal, the method comprising:
   displaying a first running screen of a specific application, the displayed first running screen including at least one image;
   detecting a first command for entering a translation mode;
   displaying a graphic user interface (GUI) window on the displayed first running screen in response to the detected first command, the displayed GUI window for selecting at least one region of the first running screen;
   detecting a second command for shifting the displayed GUI window;
   recognizing text included in a portion of the displayed at least one image that corresponds to the displayed GUI window in response to the detected second command;
   displaying a translation of the recognized text on the displayed first running screen if text corresponding to the displayed GUI window is recognized;
   enlarging a portion of the displayed first running screen within the displayed GUI window according to a preset ratio if text corresponding to the displayed GUI window is not recognized;
   recognizing text included in the enlarged portion of the displayed first running screen; and
   displaying a translation on the displayed first running screen, the translation of the recognized text included in the enlarged portion on the displayed first running screen.

8. The method of claim 7, wherein displaying the GUI window comprises:
   detecting a third command for changing at least a location or a form of the displayed GUI window; and
   changing at least the location or the form of the displayed GUI window in response to the detected third command.

9. The method of claim 7, wherein displaying the GUI window comprises:
   detecting a third command for copying the displayed GUI window;
   creating a plurality of GUI windows in response to the detected third command; and
   displaying the created plurality of GUI windows.

10. The method of claim 7, wherein the detected second command comprises a touch input to a first point in the displayed image that is dragged to a second point and further comprising changing a location of the displayed GUI window according to the detected touch input.

11. The method of claim 7, further comprising displaying additional information related to preset text included in the translation together with the displayed translation.

12. The method of claim 7, further comprising:
   pairing the mobile terminal with an external device; and
   transmitting the translation to the paired external device.

13. The method of claim 7, further comprising displaying a second running screen of a specific application of applications interworking with the translation mode together with the displayed translation, the displayed second running screen corresponding to preset text included in the displayed translation.

14. The method of claim 7, further comprising:
   detecting a third command for revising at least one portion of the displayed translation; and
   revising and storing the revised at least one portion in response the detected third command, the revised at least one portion stored by mapping the revised at least one portion to the recognized text.

15. The method of claim 11, further comprising:
   detecting a touch input on the displayed additional information; and
   performing an application corresponding to the displayed additional information.

16. The method of claim 7, further comprising:
   obtaining coordinate information;
   determining a current location of the mobile terminal using the obtained coordinate information;
   identifying information related to the determined location; and
   displaying the identified information with the displayed translation.

* * * * *